United States Patent
McNamara et al.

(10) Patent No.: US 10,283,282 B2
(45) Date of Patent: May 7, 2019

(54) STRAIN CAPACITOR ENERGY STORAGE DEVICES AND ASSEMBLIES

(71) Applicants: Shamus Patrick McNamara, New Salisbury, IN (US); Pranoy Deb Shuvra, Louisville, KY (US)

(72) Inventors: Shamus Patrick McNamara, New Salisbury, IN (US); Pranoy Deb Shuvra, Louisville, KY (US)

(*) Notice: Subject to any disclaimer, the term of this patent is extended or adjusted under 35 U.S.C. 154(b) by 121 days.

(21) Appl. No.: 14/885,193

(22) Filed: Oct. 16, 2015

(65) Prior Publication Data

US 2017/0330697 A1    Nov. 16, 2017

Related U.S. Application Data

(60) Provisional application No. 62/065,061, filed on Oct. 17, 2014.

(51) Int. Cl.

| | |
|---|---|
| *H01G 5/04* | (2006.01) |
| *H01G 5/16* | (2006.01) |
| *H01G 11/28* | (2013.01) |
| *H01G 11/52* | (2013.01) |
| *H01G 5/011* | (2006.01) |

(52) U.S. Cl.
CPC ............. *H01G 11/28* (2013.01); *H01G 5/011* (2013.01); *H01G 5/04* (2013.01); *H01G 5/16* (2013.01); *H01G 11/52* (2013.01)

(58) Field of Classification Search
CPC ................................ H01G 11/28; H01G 11/52
USPC ......................................................... 361/287
See application file for complete search history.

(56) References Cited

U.S. PATENT DOCUMENTS

| | | | |
|---|---|---|---|
| 8,736,938 B1* | 5/2014 | Schlam ..................... E06B 3/00 359/230 |
| 2008/0115428 A1* | 5/2008 | Schlam ..................... E06B 9/24 52/173.1 |
| 2011/0227872 A1* | 9/2011 | Huska ..................... G06F 3/016 345/174 |
| 2014/0125201 A1* | 5/2014 | Bhattacharjee .... H03H 9/02275 310/332 |

* cited by examiner

*Primary Examiner* — Michael P McFadden
(74) *Attorney, Agent, or Firm* — Duncan Galloway Egan Greenwald, PLLC; Kevin T. Duncan

(57) ABSTRACT

Energy storage devices are disclosed that store both electrical and mechanical energies, making the total energy stored larger than either an electrical or mechanical means alone. The energy storage device is charged by the application of a voltage, which charges a capacitor to store electrical energy while simultaneously exerting a force on the mechanical system that deforms the mechanical system, resulting in mechanical energy storage. When the charged device is discharged, both the electrical and mechanical energy are extracted in electrical form. Its unique features include, but are not limited to, the potential for long lifetime, improved safety, better portability, a wide operating temperature range, and environment friendliness. Arrays of energy storage devices can be assembled in various configurations to build high capacity energy storage units.

11 Claims, 26 Drawing Sheets

STRAIN CAPACITOR ENERGY STORAGE DEVICES AND ASSEMBLIES

CROSS-REFERENCE TO RELATED APPLICATIONS

This application claims priority to U.S. Provisional Application No. 62/065,061, filed on Oct. 17, 2014, the teachings and entire disclosure of which are fully incorporated herein by reference.

FIELD OF INVENTION

Embodiments described herein relate to energy storage devices which store energy both electrostatically and mechanically. First and second electrodes form a capacitor and are separated in some embodiments by a dielectric layer. In some embodiments, one or both of the electrodes are attached to a mechanical spring that is displaced during the charging process, thereby storing electrostatic energy as well as mechanical energy. During the discharging process, both the mechanical and electrical energy are retrieved during a discharging cycle. In alternative embodiments, the mechanical spring and the electrode are comprised of the same material. In some embodiments, one of the electrodes is formed as bilayer which creates a strain mismatch between the two layers, causing this electrode to roll up in the uncharged state. It then unrolls during a charging cycle thereby storing electrostatic energy, as well as mechanical energy due to the work performed in the unrolling process needed to overcome this electrode's natural tendency to remain in the rolled up position, such that both electrical and mechanical energy are retrieved during a discharging cycle.

BACKGROUND

There is increasing demand for energy in the world today, but reserves of conventional energy sources like fossil fuels are decreasing. Additionally, the use of those natural resources pollutes the environment, all of which leads to increased focus and attention upon renewable energy sources. Gasoline driven motor vehicles are another major consumer of fossil fuel, and consequently people are now trying to replace them with electric motor vehicles or hybrid electric motor vehicles. The problem with electric motors and other machines that require a source of renewable energy, including many consumer products, is the intermittent nature of the power sources, and the need for recharging. Moreover, temporary storage of energy is of utmost importance in renewable-energy-based power plants to level off the load and the supply of energy.

In short, the demand for improved energy storage is great. Consumers want longer-lasting batteries for their portable electronics. Utilities desire more efficient energy storage for grid-scale power leveling. Renewable energy producers are seeking energy storage because many forms of renewable energy are intermittent. People who live in rural areas want energy storage because power is not always available. Hospitals and other critical infrastructure need energy storage to provide for emergencies when power is not available. Further proof of the need for improved energy storage is demonstrated by the fact that tens of millions of dollars are devoted every year by the U.S. government alone, to research and development seeking to improve the lithium ion battery.

Moreover, various documented safety issues with lithium ion batteries have been associated with property damage, injury, and death, including exploding laptop batteries, vehicle fires, and incidents involving airplanes while carrying lithium ion batteries. Lithium ion batteries can fail if they are punctured, or charged too rapidly, or discharged too rapidly, or operated at too high a temperature.

Currently, there is great demand for high density, low weight energy storage technologies for a variety of applications, including portable electronics, electric vehicles, and electric grid stabilization. The most commonly used technology, the battery, does not meet current demand—in spite of their high energy densities, which is typically in the range of approximately 10-100 Wh/kg. Even so, batteries have other limitations, including low power density (approximately 50-200 watts per kilogram, i.e., W/kg), safety issues as previously mentioned, high cost, limited temperature range of operation, low cycle life, incidence of failure, and maintenance requirements which increase the overall cost of a battery.

Rechargeable batteries provide relatively high energy densities, although their power densities are generally lower than larger-scale capacitors. Besides the lithium ion battery, there are various kinds of batteries, which have different energy storage densities. For example, lead-acid batteries: have a relatively low energy density, do not work as well as some other kinds of batteries at low or high temperatures, exhibit a high self-discharge rate, and contain lead, which is being phased out of most applications. Nickel metal hydride batteries provide a higher energy density than lead-acid batteries, and are generally considered safer, but they have a very high self-discharge rate.

Another type of energy storage device is sometimes referred to as a "supercapacitor." Such a device meets the requirement of high power density (approximately 1000 W/kg), albeit with major limitations including low energy density (approximately 1-10 Watt hour per kilogram, i.e., Wh/kg), high leakage current and high self-discharge rate. There is a need for an improved energy storage device.

SUMMARY OF EMBODIMENTS

A strain capacitor energy storage device, according to multiple embodiments and alternatives herein, combines both electrostatic and mechanical energy storage. This increases the energy density and, therefore, the energy storage capacity, compared to electrostatic or mechanical energy storage alone. Further, in many embodiments the energy density per weight of devices and assemblies is high because most of the volume in the apparatuses is taken up by air, making them suitable for a variety of applications where the need for high energy density per weight is great, e.g., portable electronics and electric vehicles. Additionally, the devices and assemblies according to teachings herein improve the charge-voltage relationship (Q-V curve) such that more energy can be extracted during the discharge cycle—before the voltage drops below a usable value. Accordingly, even at a very high discharge rate, most of the stored energy can be extracted at conventional and usable voltage levels.

Other advantages will be apparent based on the descriptions herein. Strain capacitor energy storage devices and assemblies that incorporate these devices are formed from non-toxic materials. Thus, manufacturing and recycling is easier, and discarded units do not pollute the environment. These devices provide higher energy density compared to a battery or a capacitor, and higher output power compared to a battery. They also provide a lower self-discharge rate than either a battery or most capacitors, with a longer estimated cycle life, far exceeding that of a battery. Further, the embodiments provided herein allow for a greater range of operating and storage temperatures than a battery or most capacitors, making them more thermally stable.

Herein, for the sake of brevity, the terms "strain capacitor energy storage device" and "device" are used interchangeably. Likewise, "assembly" refers to an assembly which incorporates one or more strain capacitor energy storage devices and other components. "First electrode" refers to an electrical conductor which in some embodiments is flat and fixed or flat and movable, while in other embodiments it can either be rolled, unrolled or partially rolled state. Further, "second electrode" refers to an electrical conductor which in some embodiments is flat and movable, while in other embodiments it is capable of being in either a rolled orientation, an unrolled orientation, or a partially rolled orientation. In some embodiments, a second electrode is a bilayer material, having a strain mismatch that induces the second electrode to form a ring or coil under normal (uncharged) conditions. In the figures, "bottom electrode" is used synonymously with "first electrode," and "top electrode" is used synonymously with "second electrode."

BRIEF DESCRIPTION OF THE FIGURES

The drawings, schematics, figures, and descriptions herein are to be understood as illustrative of structures, features and aspects of the present embodiments and do not limit the scope of the embodiments. The scope of the application is not limited to the precise arrangements or scales as shown in the drawings.

MULTIPLE EMBODIMENTS AND ALTERNATIVES

In some embodiments, a strain capacitor energy storage device is an electromechanical energy storage device, providing both high power density and high energy density. Such a device efficiently stores both mechanical strain energy and electrical energy in the form of an electric field between first (15) and second (20) electrodes, in which the electrodes are preferably separated by a dielectric medium 16. The second electrode 20 consists of two strain-mismatched layers forming a bilayer structure that rolls into a coil due to the strain mismatch. A device stores mechanical energy as the second electrode 20 is actuated by applying an electrostatic potential between the two electrodes. When the charged device is discharged, both mechanical energy and electrical energy are extracted. The charge-voltage profile of the device is suitable for energy storage applications because a larger portion of the stored energy is extractable at voltage levels compared to a normal capacitor, with the capability of operating over varied operating voltage ranges by selecting appropriate materials and by changing the dimensions of the device.

Principles of Energy Storage in the Devices

Figure 1A:
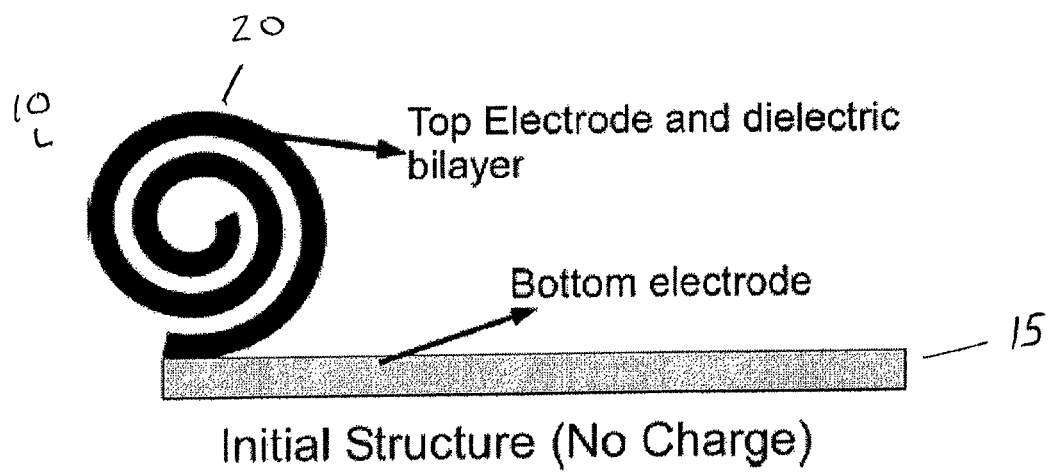
FIG. 1A is a perspective view of a strain capacitor energy storage device, according to multiple embodiments and alternatives described herein.
Figure 1B:
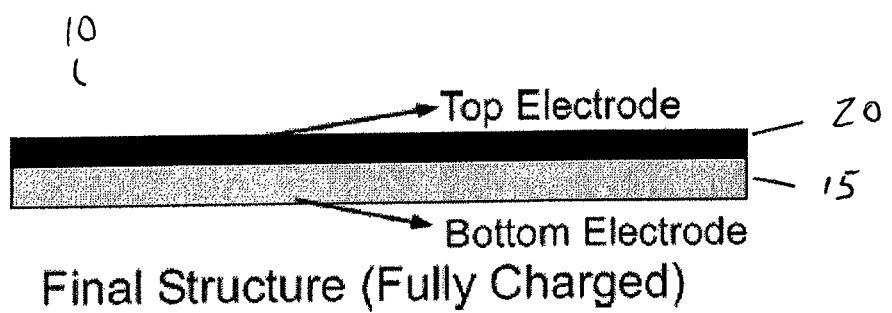
FIG. 1B is a perspective view of a strain capacitor energy storage device, according to multiple embodiments and alternatives described herein.
Figure 2A:
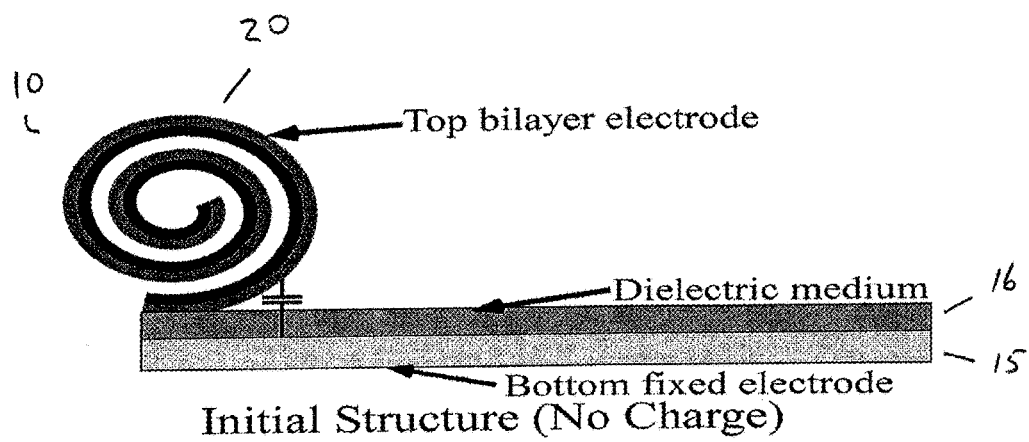
FIG. 2A is a perspective view of a strain capacitor energy storage device, according to multiple embodiments and alternatives described herein.
Figure 2B:
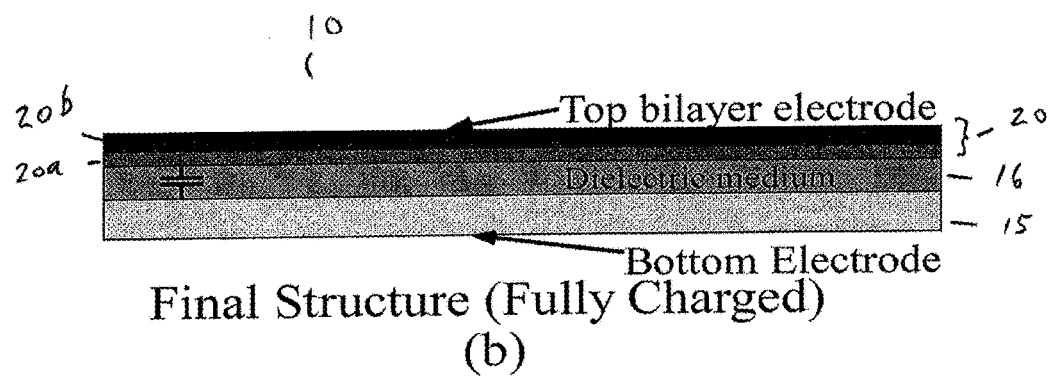
FIG. 2B is a perspective view of a strain capacitor energy storage device, according to multiple embodiments and alternatives described herein.

FIG. 1A shows a strain capacitor energy storage device 10, according to multiple embodiments and alternatives described herein. In the uncharged state, second electrode 20 is rolled up due to its intrinsic strain, minimizing the capacitance. As the device is charged, second electrode 20 unrolls, increasing the capacitor area and storing electrostatic energy. When completely unrolled as shown in FIG. 1B, the device is in its charged state, and capacitance is at its maximum value. In addition, the force required to unroll second electrode 20 requires work, and thus energy is also stored mechanically. FIG. 2A and FIG. 2B, respectively, illustrate the fully discharged state of device 10 (FIG. 2A) and the fully charged state of the device 10 (FIG. 2B).

Electrostatic energy is thus stored, and as the device is discharged, the electrostatic energy can be converted to electrical current for various applications and uses. Further, the charges on first and second electrodes 15, 20 are physically separated as the second electrode 20 rolls up, causing work to be performed, which is manifested as an increase in electrostatic potential. In this way, the strain energy is also stored and can be extracted from the device during the discharge cycle.

The electrostatic potential energy and mechanical potential energy of this system is equal to:

$$U_{elec} = \frac{1}{2} C(V) \cdot V^2 \quad (1)$$

$$U_{mech} = \int_{Vol} \sigma \epsilon dxdydz \quad (2)$$

where C(V) is the variable capacitance as a function of voltage, V is the applied voltage, σ is the stress in the second electrode 20, ε is the strain in the second electrode 20, and the integration occurs over the volume of the second electrode 20.

Figure 3:
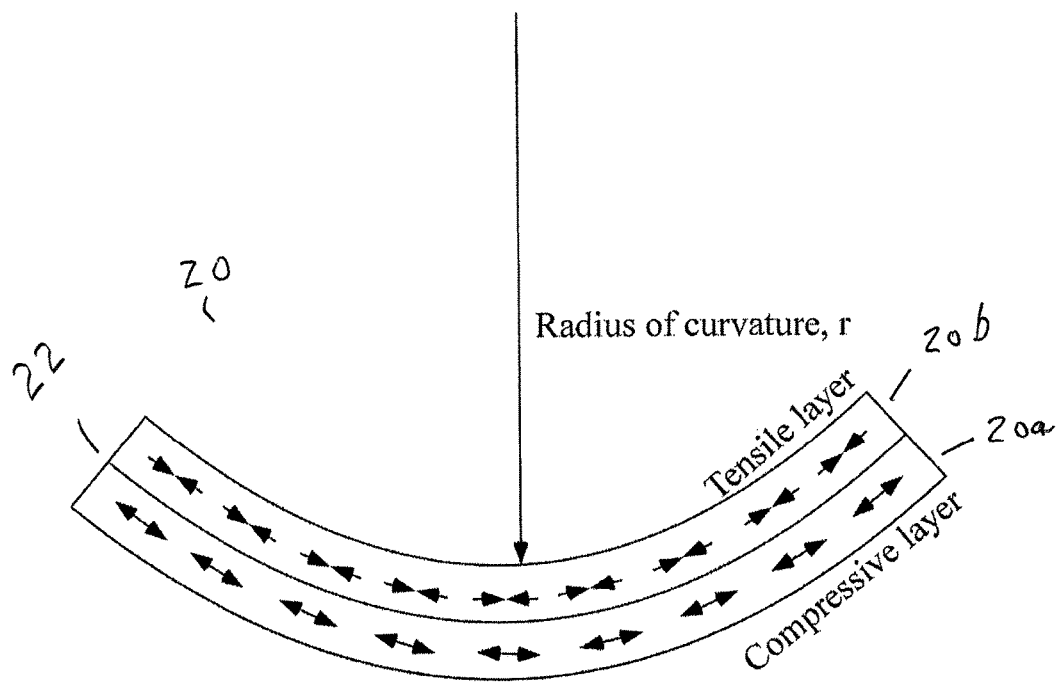
FIG. 3 is a perspective view of a bilayer material for use with a strain capacitor energy storage device, according to multiple embodiments and alternatives described herein.

In some embodiments, second electrode 20 is a plate electrode comprised of two strain mismatched layers. When two strain mismatched layers (i.e., bilayers) are deposited on top of each other, they roll-up like a coiled spring to minimize the internal strain energy. A strain mismatched bilayer structure is shown in FIG. 3, in which the top layer has a tensile stress while the bottom layer has a compressive stress. If the thickness and material properties of the layers are equal, the joining plane will be the neutral axis (represented by line 22), resulting in a radius of curvature, r. In some embodiments, in the discharged state the second electrode 20 forms a coil with radius of curvature, r. If t is the total thickness of the second electrode 20 and the thickness of each layer is t/2 (assuming they are of equal thickness) and the magnitude of both the tensile and compressive intrinsic strain is ε, the radius of curvature is given by the following equation:

$$r = \frac{2}{3} \frac{t}{\epsilon}$$

Figure 4A:
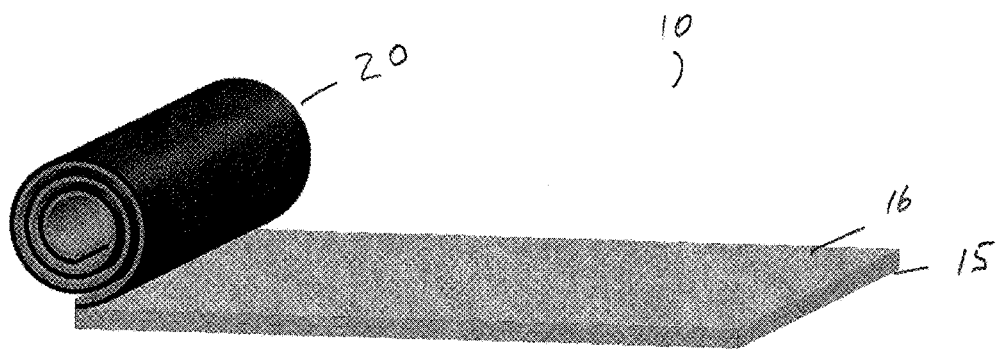
FIG. 4A is a perspective view of a strain capacitor energy storage device, according to multiple embodiments and alternatives.

FIG. 4A is a diagram of a device 10, according to multiple embodiments and alternatives, comprising first and second electrodes, 15, 20, with a dielectric film layer 16 over a surface of the flat plate that is first electrode 15. Second electrode 20 is rolled up into a coil, with the components forming a capacitor for electrically and mechanically storing energy. When a voltage is applied between first and second electrodes 15, 20, the resulting electric field causes charge to accumulate on the plate surfaces, which results in an electrostatic force to develop between the plates, tending to "unroll" the second plate 20.

Figure 4B:
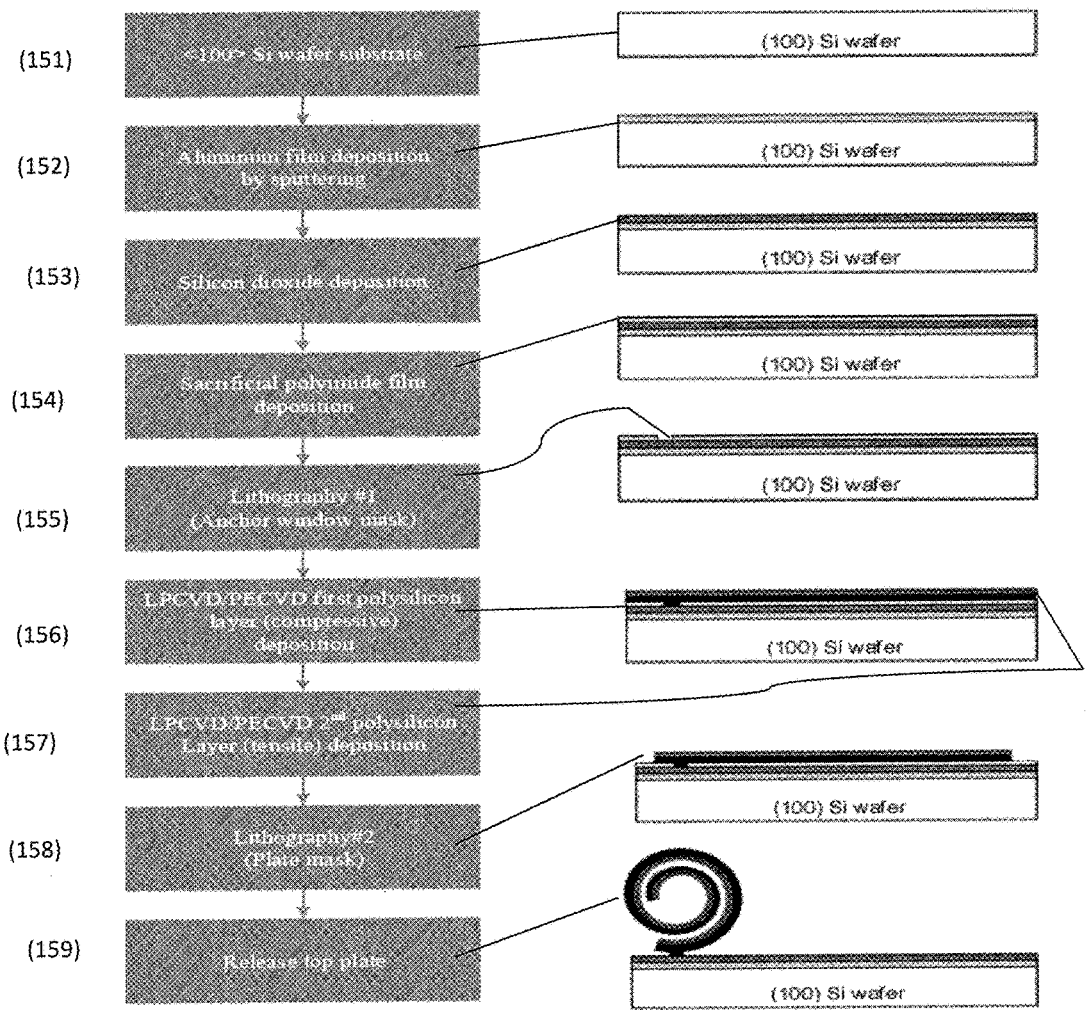
FIG. 4B is a flow chart depicting steps for fabricating a strain capacitor energy storage device, according to multiple embodiments and alternatives.

Fabrication of an exemplary device starts with a substrate (151) and proceeds by first depositing a sacrificial layer such as polyimide, aluminum or photoresist on a silicon substrate as shown at step 152 in FIG. 4B. The substrate may be (100) silicon wafer either n-type or p-type, and represents first electrode 15. The sacrificial layer is preferably of uniform thickness in the 0.1-0.2 μm range. Deposition can be by chemical vapor deposition and/or oxidation process forming a bilayer or tri-layer film as desired. A layer of for the dielectric (e.g., silicon dioxide) is then deposited at step 153, followed by another layer of sacrificial material at step 154. Anchor windows for both spacer and strain capacitor are cut during a first lithography step 155 is used to establish a window to anchor second electrode 20 to the wafer substrate. The strain mismatched polysilicon bilayer which is second electrode 20 will be deposited next at steps 156,157. Deposition can be accomplished using a plasma enhanced chemical vapor deposition (PECVD) or low pressure chemical vapor deposition (LPCVD) process, and should be performed under conditions (e.g. pressure, temperature) suitable to achieving a dichotomy of tensile stress vs compressive stress between layers. For example, by way of illustration only, layer 20b may have a tensile stress of 800 MPa while layer 20a has a compressive stress of 500 MPa. Another lithography step is then used at 158 to define the area for the second electrode 20 and, optionally, spacer 105. The sacrificial layer is then removed at step 159 by dry etching, releasing the second electrode which induces it to roll up due to its strain mismatch.

The electrostatic force and the mechanical restoring force compete against each other until the voltage reaches a threshold voltage ($V_T$), beyond which point the electrostatic force surpasses the mechanical force causing the plate to unroll. As the voltage further increases, generally within a few volts of $V_T$, the second electrode 20 keeps unrolling (which is sometimes referred to as "pulling in" or "pull-in") until the second electrode becomes flat.

The voltage at which second electrode 20 becomes flat, i.e., fully unrolled, is referred to as the flattening voltage ($V_F$). In the unrolling (charging) process, work is done on the second electrode 20 by the electrostatic force, which is stored as strain energy along with the electrostatic energy in the electric field. Conversely, during the discharge cycle, electrostatic energy as well as the strain energy is retrieved from the device because, as the second electrode 20 starts to unroll, the separation between the opposite charges on the electrode plate surfaces increases, which also increases the electrostatic potential between the plates. FIG. 15A-F shows the sequence of a top electrode (i.e., second electrode 20) beginning to unroll at $V_T$, and unrolling to substantial completion with the application of increasing voltages.

During the charging/discharging cycle, the capacitance of the device changes with applied voltage, which in turn changes the charge-voltage relationship compared to a standard flat plate capacitor. At the beginning of the charging cycle, the initial capacitance of the device is relatively low due to the smaller active surface area of the electrodes, but once the second electrode 20 is completely unrolled, the capacitance reaches its highest value, which is equal to the dimensionally equivalent parallel plate capacitor. The slope of the energy vs. voltage plot, dU/dV, is higher for device 10 than for a parallel plate capacitor, which means more energy is stored at higher voltages.

In an exemplary device, electrical energy comes from the separation of the opposite charges that accumulate on the plate surfaces. The charges form a uniform electric field between the plates as they are separated by a small distance, for example on the order of about 0.01-0.5 µm. The electrostatic energy stored in that electric field is given by:

$$U_{elec}(V) = \frac{1}{2}CV^2 \quad (4)$$

where V is the voltage applied to the electrodes and C(V) is the variable capacitance with respect to voltage given by the following expression:

$$C(V) = \frac{\epsilon A}{t_i} = \frac{\epsilon w x}{t_i} \quad (5)$$

where $\epsilon$ and $t_i$ are the dielectric constant and thickness of the insulating film, and w and x(V) are, respectively, the width and voltage-dependent effective length of the second electrode 20.

From equations (4) and (5):

$$U_{elec}(V) = \frac{1}{2}\frac{\epsilon w x}{t_i}V^2 = \frac{1}{2}\epsilon w t_i x \mathcal{E}^2 \quad (6)$$

given that the electric field in the dielectric is given by $E=V/t_i$.

Charge accumulates only on the surfaces of electrodes 15, 20, so the thickness can be chosen to be arbitrarily small. If the thicknesses of electrodes 15, 20 are negligible, then the volume of the device is given by $Vol(V)=wt_i x$. The effective volume will be maximum at a voltage $V_F$ which causes the second electrode 20 to be completely unrolled (flat) substantially parallel to first electrode 15, and the voltage $V_F$ corresponds to maximum electrical energy stored by device 10:

$$U_{elec}(V_{flat}) = \frac{1}{2}\epsilon w t_i L \mathcal{E}_{crit}^2 \quad (7)$$

where L is the length of the top plate. Thus, the maximum electrostatic energy density due to the electrical portion of the energy is given by:

$$D_{elec} = (\tfrac{1}{2})\epsilon \cdot \mathcal{E}_{crit}^2 \quad (8)$$

where $\epsilon_{ox}$ of the dielectric constant of the dielectric layer 16 and $\mathcal{E}^2 crit$ is the point at which breakdown of the dielectric layer occurs, referred to as the critical electric field.

In addition to electrical energy, device 10 stores mechanical energy, as well, during the unrolling cycle of the second electrode 20. The stored mechanical energy can be determined from the following expression:

$$U_{mech} = \int_{Vol} \sigma \epsilon \, dx\, dy\, dz \quad (9)$$

where $\sigma$ is the stress of the second electrode 20, and $\epsilon$ is the strain of the second electrode 20s. If E is the Young's modulus of the top plate material, stress can be expressed as:

$$\sigma = E\epsilon \quad (10)$$

Figure 5A:
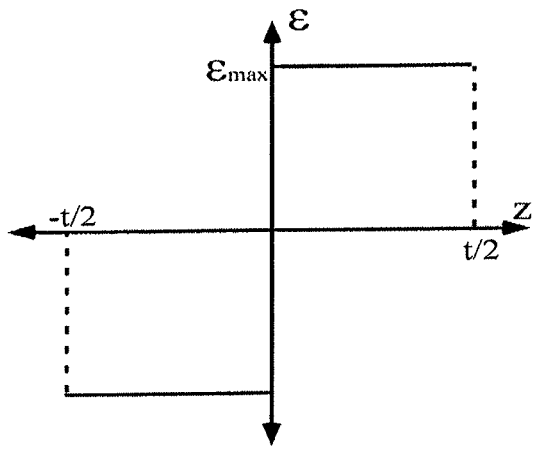
FIG. 5A is a graph depicting the strain profile of an electrode in an unrolled configuration (charged) as part of a strain capacitor energy storage device, according to multiple embodiments and alternatives described herein.
Figure 5B:
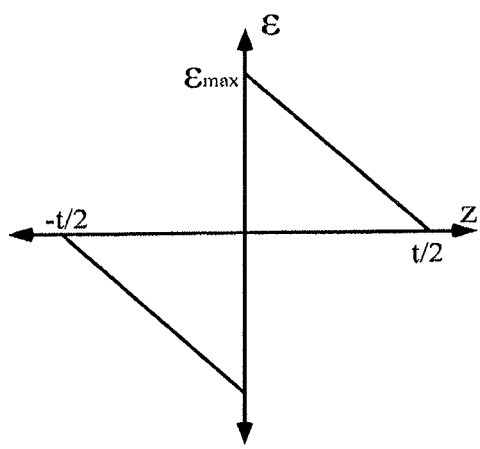
FIG. 5B is a graph depicting the strain profile of an electrode in a rolled configuration (uncharged) as part of a strain capacitor energy storage device, according to multiple embodiments and alternatives described herein.
Figure 5C:
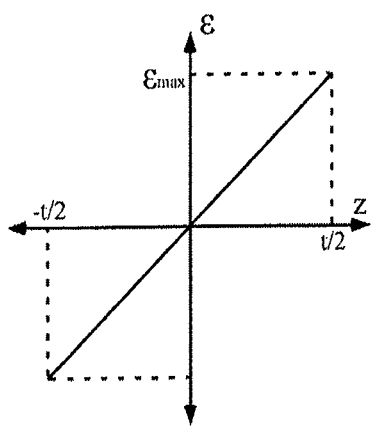
FIG. 5C is a graph comparing the strain profile between the rolled and unrolled configurations of an electrode as part of a strain capacitor energy storage device, according to multiple embodiments and alternatives described herein.

The strain on the second electrode 20 is constant in the x and y direction. Strain only changes in the z direction along the thickness t of the second electrode. With reference to FIG. 3, in an electrode 20 in which the same materials are used for both the tensile layer 20b and the compressive layer 20a, FIG. 5A and FIG. 5B illustrate the strain profiles in the second electrode along thickness at unrolled state and rolled state, respectively. FIG. 5C shows the difference in strain resulting from the transformation between the charged (unrolled) and uncharged (rolled) configurations of the second electrode 20.

Based on the above assumption regarding materials for layers 20a and 20b, equation (9) can be written as:

$$U_{mech} = E x L \int_{-t/2}^{t/2} \epsilon^2 \, dz \quad (11)$$

where L is the length of the top plate.

From FIG. 5C, change in strain can be expressed as a function of z as follows:

$$\epsilon = \frac{\epsilon_{max}}{t/2} z \quad (12)$$

where $\epsilon_{max}$ is the maximum strain in the bilayer. If the tensile layer 20b and the compressive layer 20a have internal stresses of $\sigma_1$ and $\sigma_2$ respectively, $\epsilon_{max}$ is given by:

$$\varepsilon_{max} = (\sigma_1 - \sigma_2)\left(\frac{1-v}{E}\right) \quad (13)$$

where v is the Poisson's ratio. From (11) and (12), $$U_{mech} = EwL\int_{-t/2}^{t/2} \frac{\varepsilon_{max}^2}{t^2/4} z^2 dz = \frac{4EwL\varepsilon_{max}^2}{t^2}\int_{-t/2}^{t/2} \frac{\varepsilon_{max}^2}{t^2/4} z^2 dz \quad (14)$$

The total mechanical energy is found by integrating (14):

$$U_{mech} = \frac{EwL\varepsilon_{max}^2 t}{3} \quad (15)$$

The effective volume is needed to find the energy density of the mechanical portion of total energy. Since device 10 has out-of-plane structure, the effective volume will be the volume necessary to operate the device without hindrance. In the z direction the height of the effective volume is given by (2r+2t) where r is the radius of curvature given by (3), above.

The mechanical energy density is:

$$D_{mech} = \frac{U_{mech}}{Vol} = \frac{Et\varepsilon_{max}^2}{6(r+t)} \quad (16)$$

Replacing r using the expression from (3), the mechanical energy density can be expressed as:

$$D_{mech} = \frac{E\varepsilon_{max}^3}{4 + 6\varepsilon_{max}} \quad (17)$$

Accordingly, it is possible to increase the energy density of device 10 by using material for second electrode 20 having a relatively high Young's modulus and maximum strain. In some embodiments, graphene will be used selected as the material for second electrode 20, as it has a higher maximum strain and higher Young's modulus than silicon. A device having a second electrode 20 formed from a single layer of graphene would exceed the energy density of many conventional batteries.

The maximum total stored energy of device 10 is the sum of the maximum mechanical and the maximum electrical energy. In some embodiments, the total energy of device 10 is found by adding (7) and (15):

$$U_{tot} = wL\left(\frac{1}{2}\epsilon_i\mathcal{E}_{crit}^2 + \frac{E\varepsilon_{max}^2 t}{3}\right) \quad (18)$$

To calculate total energy density, the entire volume of device 10 must be considered, accounting for proper functioning space for the device. Thus the length and width are L and w, respectively, while the height is given by (2r+2t+$t_i$) because the thickness of the dielectric medium 16 (in FIG. 2A, for example) must be included along with the curvature diameter and twice the thickness of the second electrode. The total energy density is given by:

$$D_{tot} = \frac{3\epsilon_i\mathcal{E}_{crit}^2 + 2E\varepsilon_{max}^2 t}{6(2r + 2t + t_i)} \quad (19)$$

The preceding equations explain the basis for total stored energy according to the dimensions of the device, and are scalable for purposes of optimizing device 10 for particular applications, or for optimizing one or more assemblies containing devices 10 for applications. For example, mechanical energy density will vary based on the material chosen for second electrode 20, irrespective of dimension, while the radius of curvature of second electrode 20 depends on the thickness of this electrode. Moreover, the radius of curvature determines the active area of the second electrode 20 on which electric force is exerted to establish the pull-in, as shown in FIG. 1B and FIG. 2B, thereby influencing the net electrostatic driving force between the plates. Likewise, thickness of second electrode 20 also determines the mechanical restoring force, as well as $V_T$ of the device for a given material. However, there is a limit on how much voltage can be applied across electrodes 15, 20, above which breakdown will occur, which can be expressed as:

$$V_{max} = t_i\mathcal{E}_{crit} \quad (20)$$

Accordingly, the operating voltage must be lower than $V_{max}$ to avoid dielectric breakdown of device 10. From (20) it will be appreciated that a higher pull-in voltage needs a thicker dielectric material, but the tradeoff is a thicker dielectric material also reduces electrostatic energy, as seen from (6). Accordingly, in some embodiments, the thickness of dielectric layer 16 will tend to be reduced, in order to increase the electrostatic energy. In some embodiments, the thickness of dielectric layer 16 is about 0.0-0.5 micrometers (μm). In turn, the thickness of the second electrode 20 will be set such that $V_F$ is very close to, but below, $V_{max}$. Under conditions such as these, the maximum mechanical and maximum electrical energy will be stored at voltage $V_F$. To increase the stored energy further, $V_F$ must be increased, which will involve changing the material of dielectric layer 16 to one with a higher breakdown voltage for the same thickness with the same or higher dielectric constant. Non-limiting examples of such materials include silicon dioxide, silicon nitride, hafnium oxide, and polyimide.

Figure 6A:
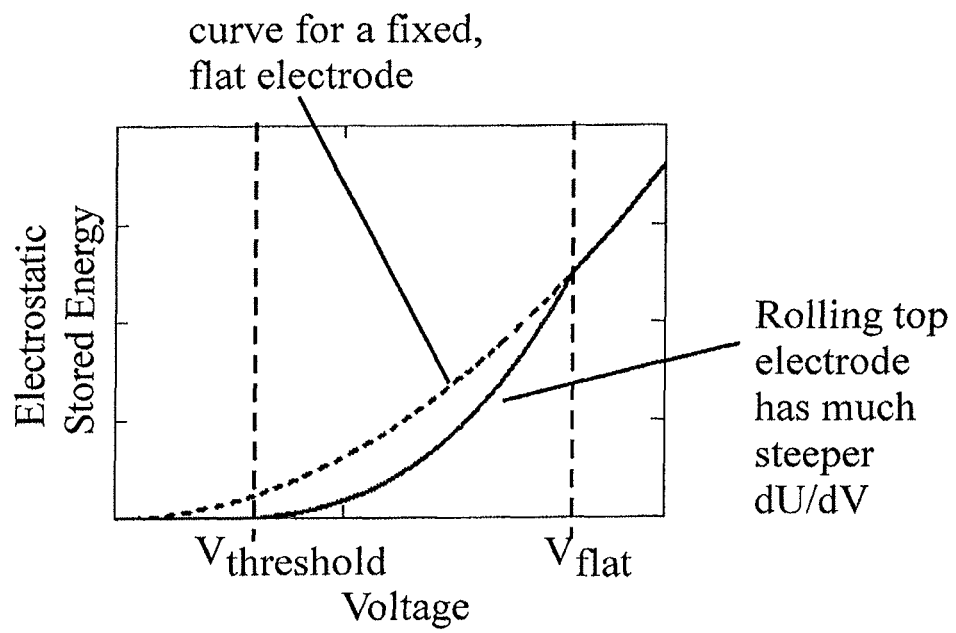
FIG. 6A is a graph which compares electrostatic characteristics of a parallel plate capacitor with characteristics of a strain capacitor energy storage device, according to multiple embodiments and alternatives described herein.
Figure 6B:
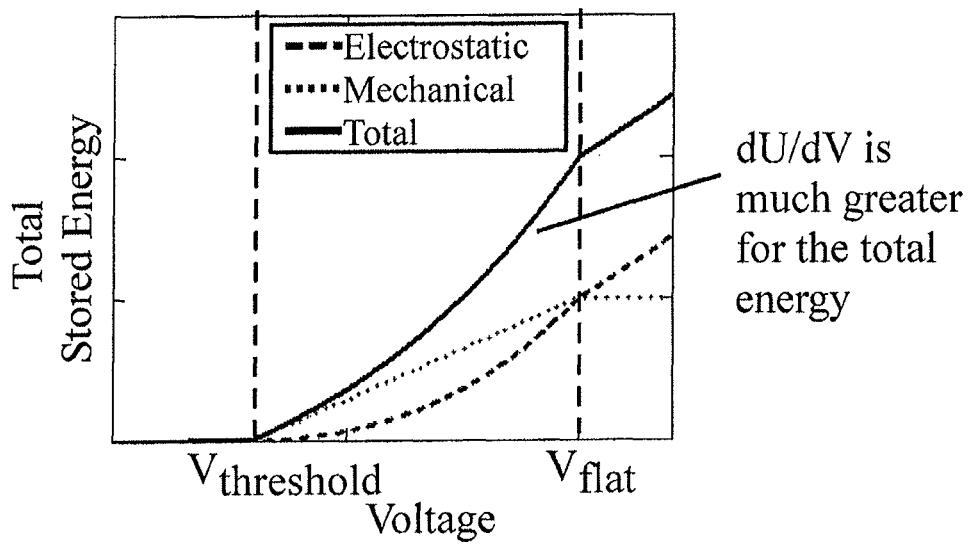
FIG. 6B is a graph which illustrates certain electrostatic properties of a strain capacitor energy storage device, according to multiple embodiments and alternatives described herein.

FIG. 6A shows a graph representing the energy stored (electrostatic plus mechanical) as a function of voltage, and FIG. 6B graphs total energy vs. voltage. During charging, when the capacitor voltage is below $V_T$, very little mechanical energy is stored. But when voltage exceeds this threshold value, the mechanical energy starts to increase at a high rate until the second electrode 20 becomes unrolled (i.e., pulled in, or flattened) at voltage $V_F$. Thus a considerable amount of mechanical energy is stored in this relatively small range—$V_T$ to $V_F$—due to the large deflection of second electrode 20. However, beyond $V_F$ the mechanical energy stays constant because complete pull-in of the second electrode 20 has occurred, and there is no more capacity for further storage of mechanical energy. As seen from FIGS. 6A, 6B, the slope (dU/dV) is much higher for the total stored energy (electrostatic and mechanical) vs. voltage (6B), as compared to the electrostatic stored energy vs. voltage (6A). This reflects the increase in total stored energy higher voltages greater than $V_T$ due to the combined effect of stored mechanical energy.

Fabrication of Assemblies Containing One or More Devices

In some embodiments, first electrode 15 is a plate electrode formed from a silicon substrate (15) and insulating dielectric layer (16) is silicon dioxide (SiO2). In some embodiments, electrode 15 and layer 16 are formed as an unitary piece through conventional methods and techniques, e.g., such as by oxidizing a first side of a silicon wafer forming an oxide layer.

In some embodiments, second electrode 20 comprises a polysilicon layer having both a tensile layer (20*b*) and compressive layer (20*a*) to form a strain mismatch which induces it to roll up into a coil-like structure in the uncharged state. The second electrode may be deposited over first electrode 15 according to conventional methods and techniques. Alternatively, second electrode 20 is formed from bilayers of graphene (20*a*, 20*b*, respectively) presenting a tensile and compressive layer. In still other embodiments, each layer 20*a*, 20*b* of second electrode 20 is formed from different materials, yet forming compressive/tensile layers to present a strain mismatch to induce rolling in the uncharged state, e.g., aluminum/silicon, aluminum/single layer graphene, silicon/single layer graphene.

Alternatively, second electrode 20 is formed from single layer, 2-dimensional ("2-d") materials (not shown) like graphene. In such embodiments, strain is induced via functionalization on only one side to avoid strain symmetry, or through different functionalization of the two sides of the 2-d material such that one side is tensile and the other side is compressive. Other suitable, single layer, 2-d materials for the second electrode include, for example, tungsten diselenide and molybdenum disulfide. Advantages of fabricating the second electrode from bi- or single layer graphene or other 2-d materials is their low weight density, thereby permitting longer electrodes having more surface area fitting within a relatively closed space.

Figure 7A:
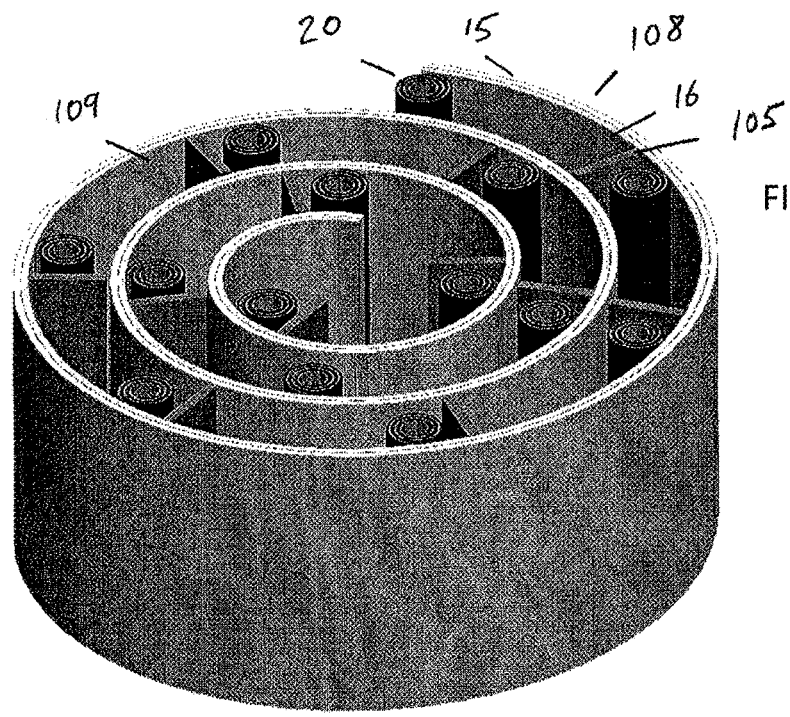
FIG. 7A is a perspective view of an assembly comprising multiple strain capacitor energy storage devices, according to multiple embodiments and alternatives described herein.
Figure 7B:
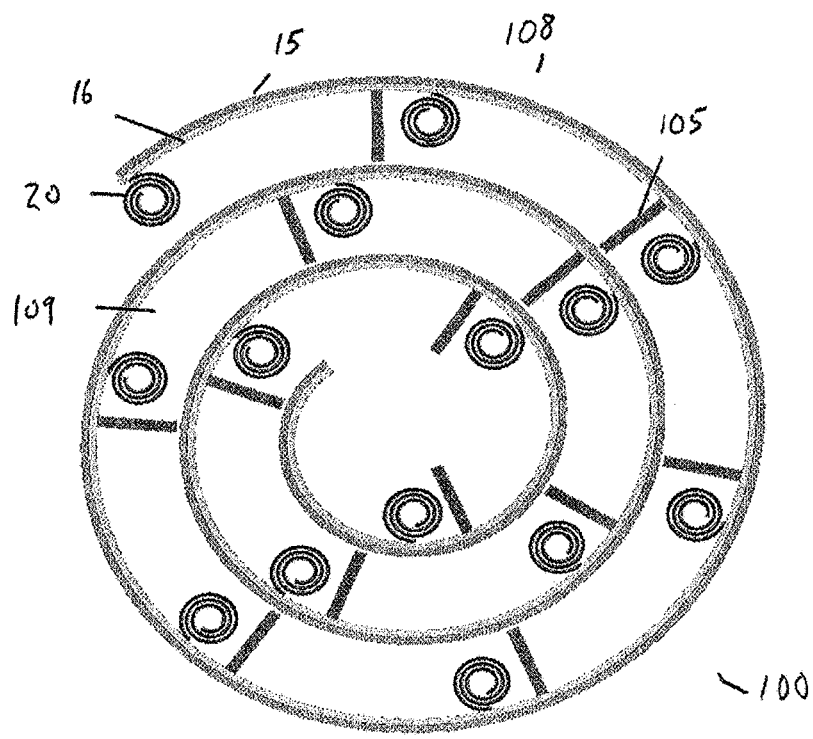
FIG. 7B is an overhead view of the assembly of FIG. 7A, according to multiple embodiments and alternatives described herein.

An assembly contains one or more devices configured as desired, within a supporting structure 108 that is arranged to accept the devices and allow for unimpeded movement of the second electrode during the charging and discharging cycles. Non-limiting examples of assemblies are shown in FIGS. 7A, 7B, 9A, 9B, 10A, 10B 11A, 11B, 12A, and 12B. FIG. 7A is a perspective view showing an assembly 100, with a 14 of second electrode 20 (only one of which is labeled) in electrical contact with first electrode 15 and dielectric layer 16, a plurality of spacers 105 (only one of which is labeled) for structural support 108. FIG. 7B is an overhead view of FIG. 7A. The other figures mentioned in this paragraph show like structures using like numbering. Collectively, these figures represent device assembly geometries that include coiled (for second electrode 20 of device 10), cylindrical (e.g., FIGS. 7A, 7B), rectangular FIGS. 9A, 9, 10A, 10B, 12A, 12B, and linear FIGS. 11A, 11B, but the embodiments are not limited to particular assembly geometries or configurations. The scope of embodiments are not limited by the geometric shape of the support structure. Other assembly geometries may include, for example, hexagonal and octagonal.

In some embodiments, spacers 105 are attached to the support structure 108 by any of a number of optional ways commonly found in microfabrication. These include, but are not limited to: depositing spacer material over a desired region of the support structure, defined photolithographically, followed by etching away the unwanted material; depositing a sacrificial layer over the entire region, followed by removing a portion of the sacrificial layer and filling that portion in with spacer material, followed by removing the remainder of the sacrificial layer material; using a stencil to deposit spacer material in defined regions; attaching spacers in the shape of balls using a ball bonder; and overlaying a grid made from metal or other conductive material over the support structure wherein the devices would operate between the grid lines, to name a few.

Another expected advantage based upon the embodiments described herein is the ability to manufacture devices 10 and assemblies 100 using roll-to-roll manufacturing methods for high volume, low cost manufacturing. With at least one spacer 105, which is positioned between any two devices, a sheet with multiple electrical storage devices 10 can be rolled up to create assemblies having a form factor similar to existing electrolytic capacitors. The assemblies will be useful in a number of applications where batteries or capacitors are typically used.

Figure 8A:
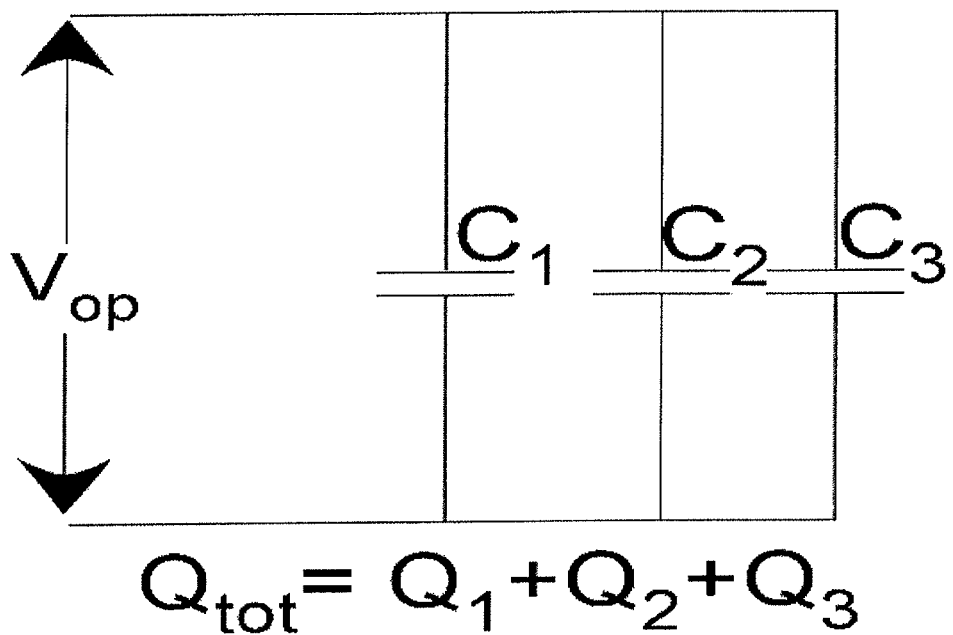
FIG. 8A is a circuit diagram of an assembly comprising multiple strain capacitor energy storage devices, according to multiple embodiments and alternatives described herein.
Figure 8B:
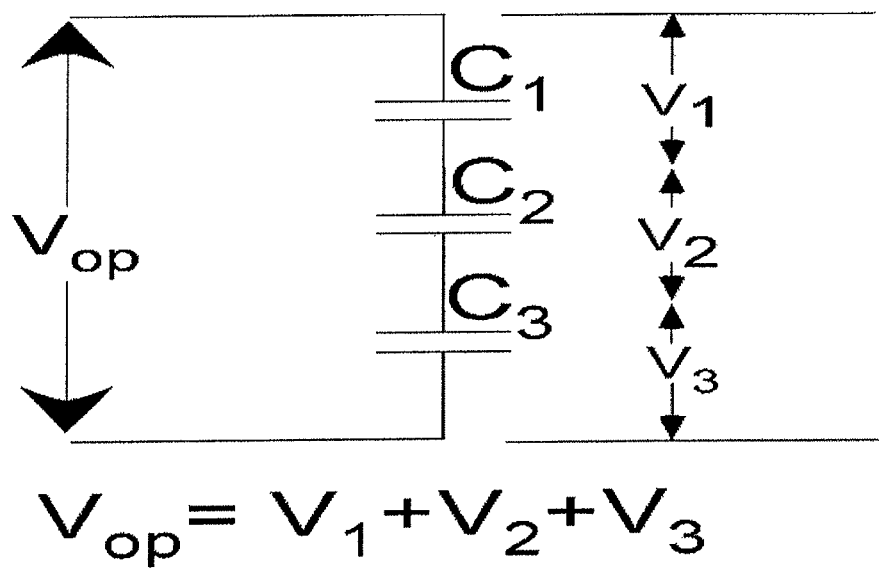
FIG. 8B is a circuit diagram of an assembly comprising multiple strain capacitor energy storage devices, according to multiple embodiments and alternatives described herein.

The amount of energy stored depends on several factors. In addition to factors that bear upon capacitor storage capacitor, such as plate thickness and area among others known in the art, size and shape of the device, the length of second electrode 20 is proportional to resistance to unrolling and, therefore, to mechanical energy storage capacity. It will be appreciated that in some designs of device 10 according to multiple embodiments and alternatives, a flattening voltage (i.e. the voltage at which second electrode 20 becomes completely unrolled and thereby flat) will be slightly lower than the breakdown voltage of the dielectric medium. Adjustment for specific applications will depend on the suitable operating voltage for desired levels of energy storage capacity of devices 10 and assemblies 100. A way to increase total energy storage capacity of any given system comprising one or more devices or assemblies is by combining multiple devices, or multiple assemblies in light of the voltage and power requirements for a particular application. For example, a parallel combination of devices or assemblies (represented by C1, C2, and C3), with a suitable wiring method as provided in FIG. 8A, increases the total charge ($Q_{tot}$) and thereby the power rating of the system, while keeping the operating voltage ($V_{op}$) constant. By way of a different example, again non-limiting, a series combination of devices or assemblies, a suitable wiring method for which is provided in FIG. 8B, increases the system's $V_{op}$ while keeping charge constant. Accordingly, as with batteries, systems containing one or more devices or one or more assemblies can be tailored to different sizes and geometries depending on the requirement of the applications.

In the assembly of FIGS. 7A, 7B, a spiral structure 108 supports the electrical layers and separators of assembly 100. Spiral structure 108 is commensurate in size with the number of devices utilized (here, 14). It is the holder of 14 compartments 109 each containing a device and thereby forming smaller spirals. In some embodiments, structure 108 forms a cylinder which can be placed on its side as in FIG. 7A, and is formed of two layers, one being dielectric layer 16 and the other being first electrode 15 serving as a ground plate for devices 10. FIGS. 7A, 7B show 14 different second electrodes and 14 different separators 105, with only one being labeled in each case. First electrode 15 and dielectric layer 16 are preferably unitary with each assembly 100, for efficiency reasons in roll-to-roll manufacturing, or they can be provided as separate joined segments in the assembly. The coil-like structures are the second electrodes 20 of devices 10 which unroll upon application of an external voltage. Each assembly 100 must provide sufficient length within compartment 109, at least equal to the length of second electrode 20, for electrode 20 to unroll. Separators 105 function to protect assembly 100 from mechanical stress, thereby preventing the supporting structure 108 from collapsing and obstructing the unrolling (while charging) or rolling (while discharging) movement of the second electrodes 20. By way of non-limiting illustration, options for materials forming separators 105 include silicon dioxide, silicon nitride, hafnium oxide, polyimide, as well as other polymers or ceramics. The scope of embodiments are not limited by the number of devices 10 incorporated within assemblies 100, and it will be further appreciate that the diameter of supporting structure 108 will be proportional to how many of devices 10 are used in an assembly 100. In some embodiments, multiple assemblies 100 forming individual cylindrical units are cascaded side-by-side and/or stacked on top of each other (see FIG. 10A) to achieve greater energy density and energy storage capacity, e.g., in parallel to maintain a constant voltage range needed for actuation.

Figure 9A:
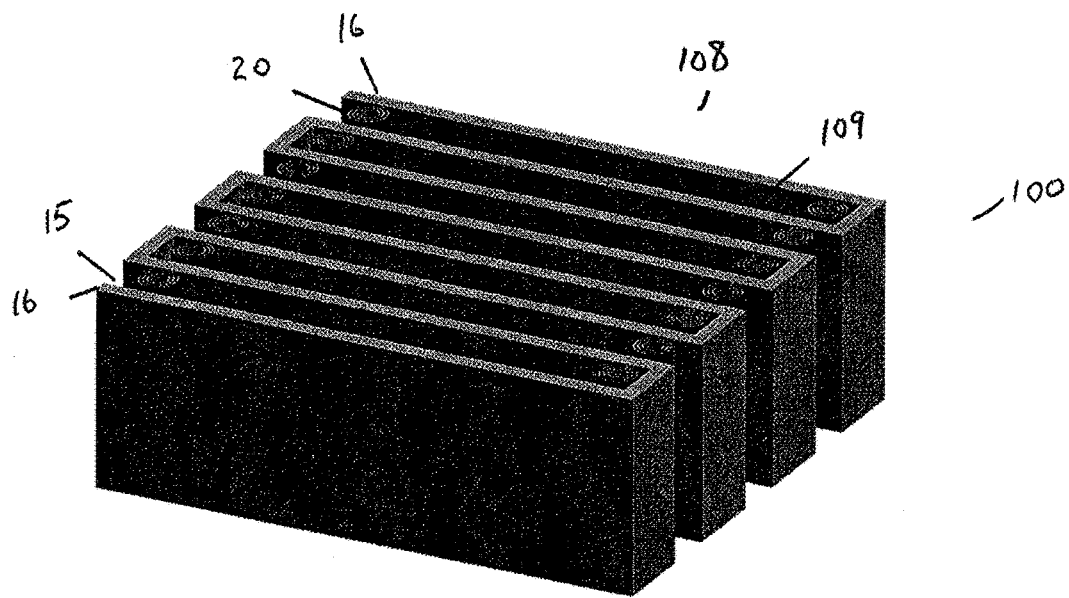
FIG. 9A is a perspective view of an assembly comprising multiple strain capacitor energy storage devices, according to multiple embodiments and alternatives described herein.
Figure 9B:
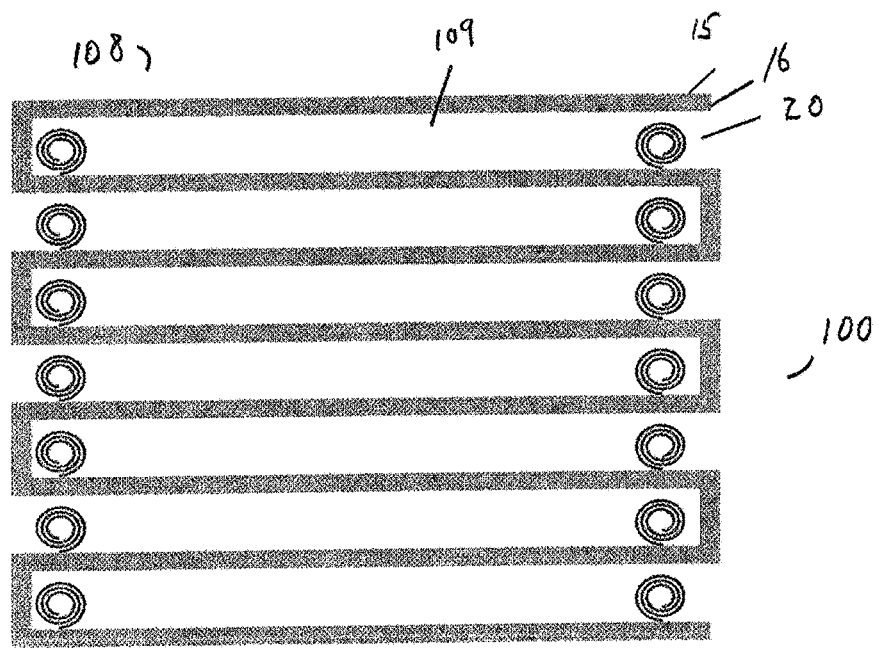
FIG. 9B is an overhead view of the assembly of FIG. 9A, according to multiple embodiments and alternatives described herein.
Figure 10A:
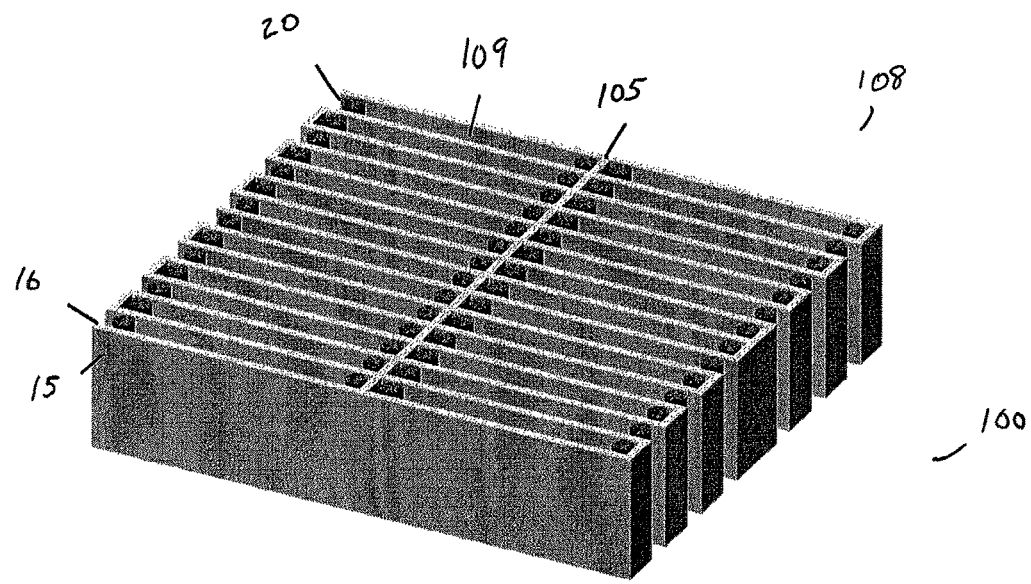
FIG. 10A is a perspective view of an assembly comprising multiple strain capacitor energy storage devices, according to multiple embodiments and alternatives described herein.
Figure 10B:
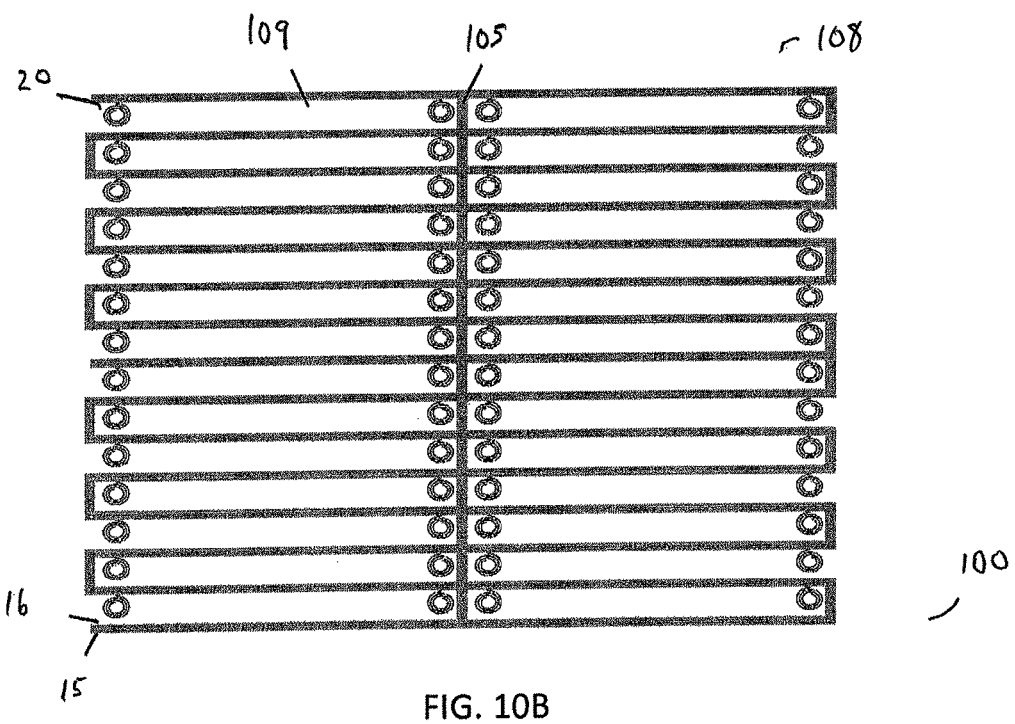
FIG. 10B is an overhead view of the assembly of FIG. 10A, according to multiple embodiments and alternatives described herein.

FIGS. 9A, 9B illustrate another possible configuration of assembly 100, according to multiple embodiments and alternatives. Supporting structure 108 follows a zigzag pattern forming a rectangular shape. Supporting structure 108 has three layers among which the outer two layers are dielectric films. The inner layer is first electrode 15 and acts as the ground electrode for the assembly 100. In this configuration, a plurality of second electrodes 20 (one of which is marked, the embodiments are not limited by number of second electrodes) are positioned on a flat, plate surface of structure 108 with positioning suitable for maintaining sufficient for unrolling/rolling. Again the wiring scheme will determine the equivalent capacitance, operating voltage range and power rating of the system. The length of supporting structure 108 is variable based upon the number of devices desired or needed, and individual assemblies 100 can be cascaded or stacked to accommodate more devices and achieve greater storage capacity.

Figure 11A:
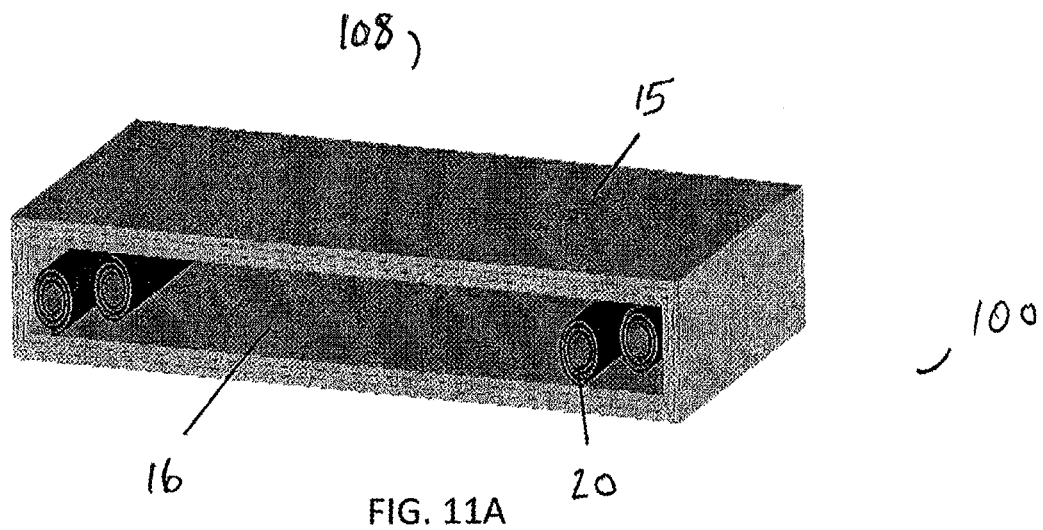
FIG. 11A is a perspective view of an assembly comprising multiple strain capacitor energy storage devices, according to multiple embodiments and alternatives described herein.
Figure 11B:
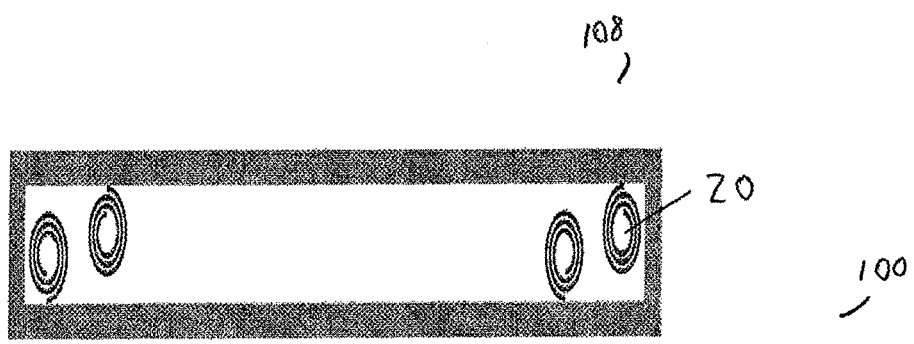
FIG. 11B is an overhead view of the assembly of FIG. 11A, according to multiple embodiments and alternatives described herein.
Figure 12A:
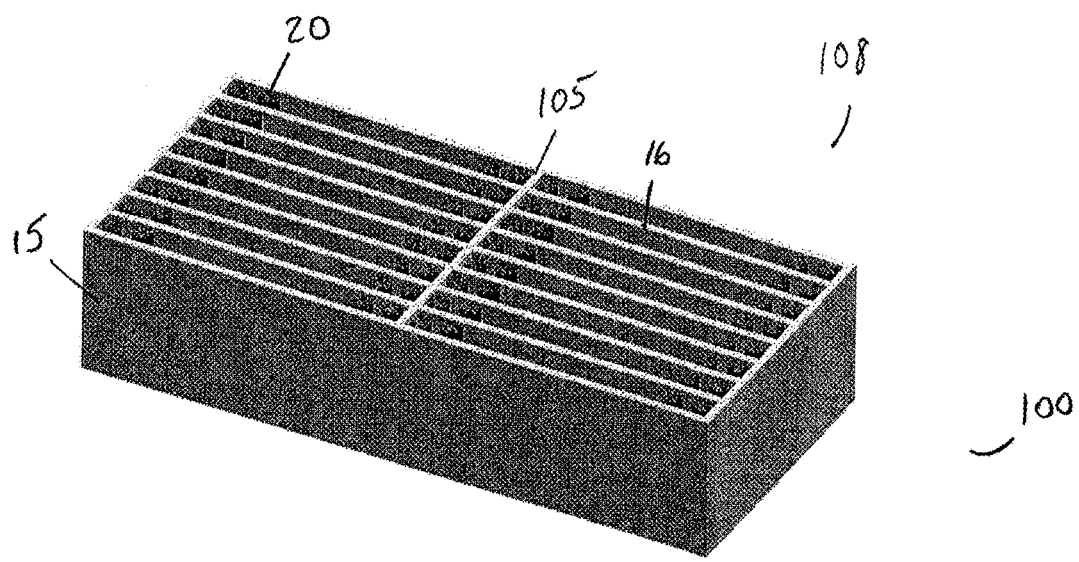
FIG. 12A is a perspective view of an assembly comprising multiple strain capacitor energy storage devices, according to multiple embodiments and alternatives described herein.
Figure 12B:
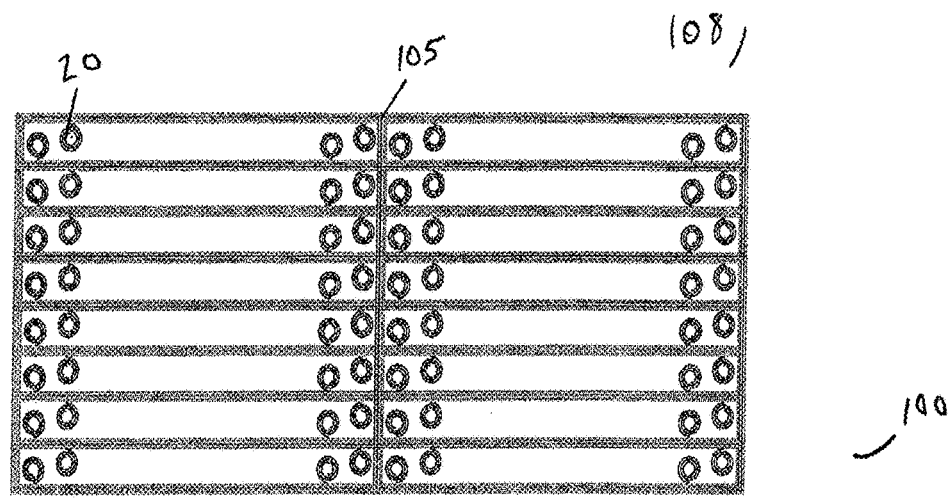
FIG. 12B is an overhead view of the assembly of FIG. 12A, according to multiple embodiments and alternatives described herein.

FIGS. 11A, 11B illustrate another option associated with more efficient space usage, which takes advantage of the fact that the devices of assembly 100 can be configured to actuate simultaneously i.e. they unroll at the same rate and same phase if the device dimensions are the same. The synchronization between devices 10 thus enables shared space between two closely placed devices as shown in FIGS. 11A, 11B. This approach almost doubles the number of devices that can be accommodated in rectangular storage units. Likewise, FIGS. 12A, 12B illustrate an assembly where a number of rectangular units as those in FIGS. 11A, 11B are cascaded and stacked.

Figure 12C:
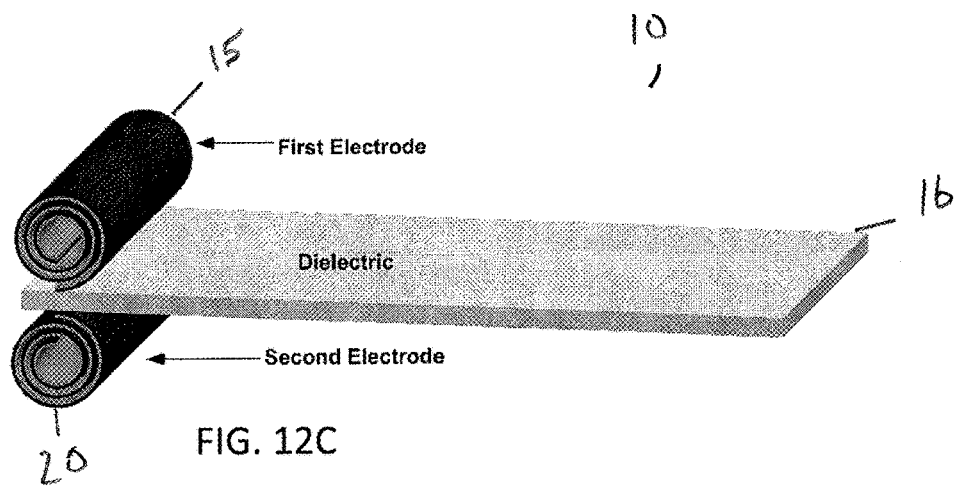
FIG. 12C is a perspective view of a strain capacitor energy storage device, according to multiple embodiments and alternatives described herein.

FIG. 12C is a perspective view of a strain capacitor energy storage device, according to an alternative configuration in which each of first and second electrodes (15, 20) are configured to roll formed with a strain mismatch, as previously described, causing each of these to roll up in the uncharged state, with a dielectric layer 16 therebetween. First electrode 15 undergoes cycles of charging (rolling into the configuration shown in FIG. 12C) and discharging (unrolling) as does second electrode 20, thereby increasing the total strain energy of the device. In such embodiments, both electrodes 15, 20 are rolled while a flat fixed dielectric layer 16 is positioned between them. When voltage is applied between the electrodes, both electrodes unroll and thereby contribute to the stored mechanical energy of device 10. As a result, total mechanical energy of this device is twice as high as that of embodiments shown in, e.g., FIG. 7A-B.

Figure 12D:
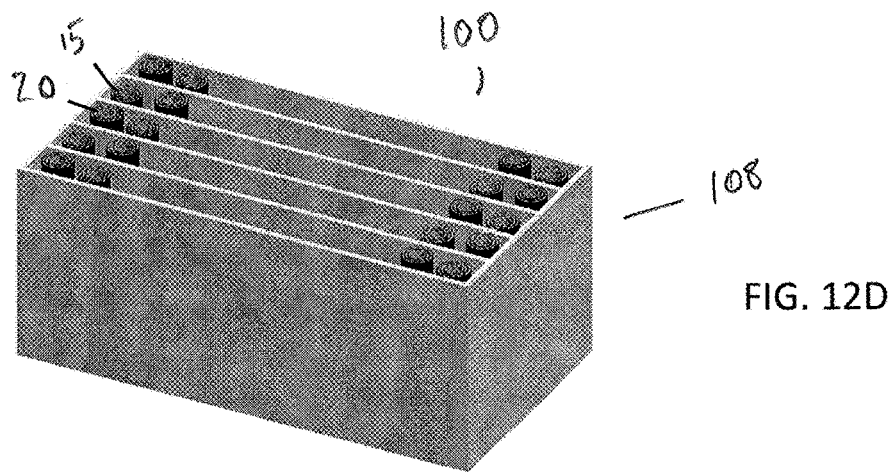
FIG. 12D is a perspective view of an assembly comprising multiple strain capacitor energy storage devices, according to multiple embodiments and alternatives described herein.
Figure 12E:
FIG. 12E is an overhead view of the assembly of FIG. 12D, according to multiple embodiments and alternatives described herein

FIG. 12D, 12E provide views of an assembly 100 containing multiple devices 10 according to the double-rolled electrode configuration of FIG. 12C, wherein the devices are situated in a rectangular configuration within a supporting structure 108. The fabrication process for assemblies similar to FIG. 12D is similar to that which was previously described, except that the metal layer is no longer needed in the supporting structure. In some embodiments, one or more separators 105 (not shown in FIG. 12D) are provided to reduce mechanical stress within the supporting structure 108.

All aforementioned assembly configurations can be adopted to any types of strain capacitors including but not limited to strain capacitor implementations shown in FIG. 18, FIG. 19, FIG. 20, FIG. 21 and FIG. 22, with little or no modifications.

Computer Simulations of Devices According to Multiple Embodiments and Alternatives The following descriptions of computer simulations of the device are offered in non-limiting fashion to further illustrate various embodiments and alternatives, their operations, and their advantages, according to the teachings herein. However, the descriptions of simulations are not to be construed as limiting the scope of the subject matter described and claimed herein. Further, while the simulations provide general information as to the performance of devices according to multiple embodiments and alternatives herein, the simulations might not be 100% accurate in predicting the performance of these devices in actual use.

In the simulations, the length of the second electrode (rolled) was set to be sufficiently short that it would not completely curl up and contact itself, which permits the radius of curvature to be calculated, albeit with limits upon the amount of stored energy produced in the simulation.

Electromechanical Simulation

Figure 13:
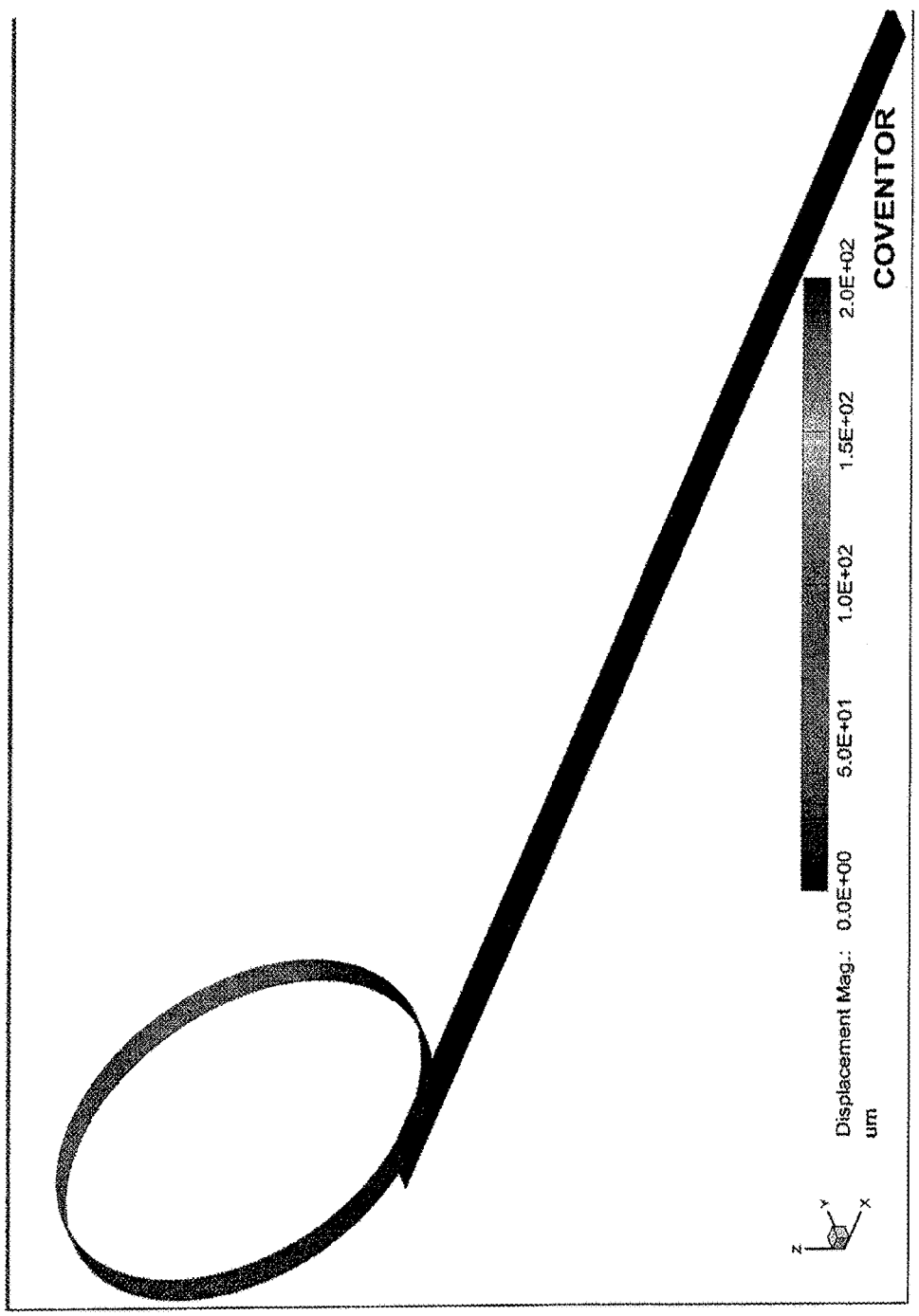
FIG. 13 depicts a strain capacitor energy storage device as the subject of simulations described herein, according to multiple embodiments and alternatives.
Figures 14A, 14B:
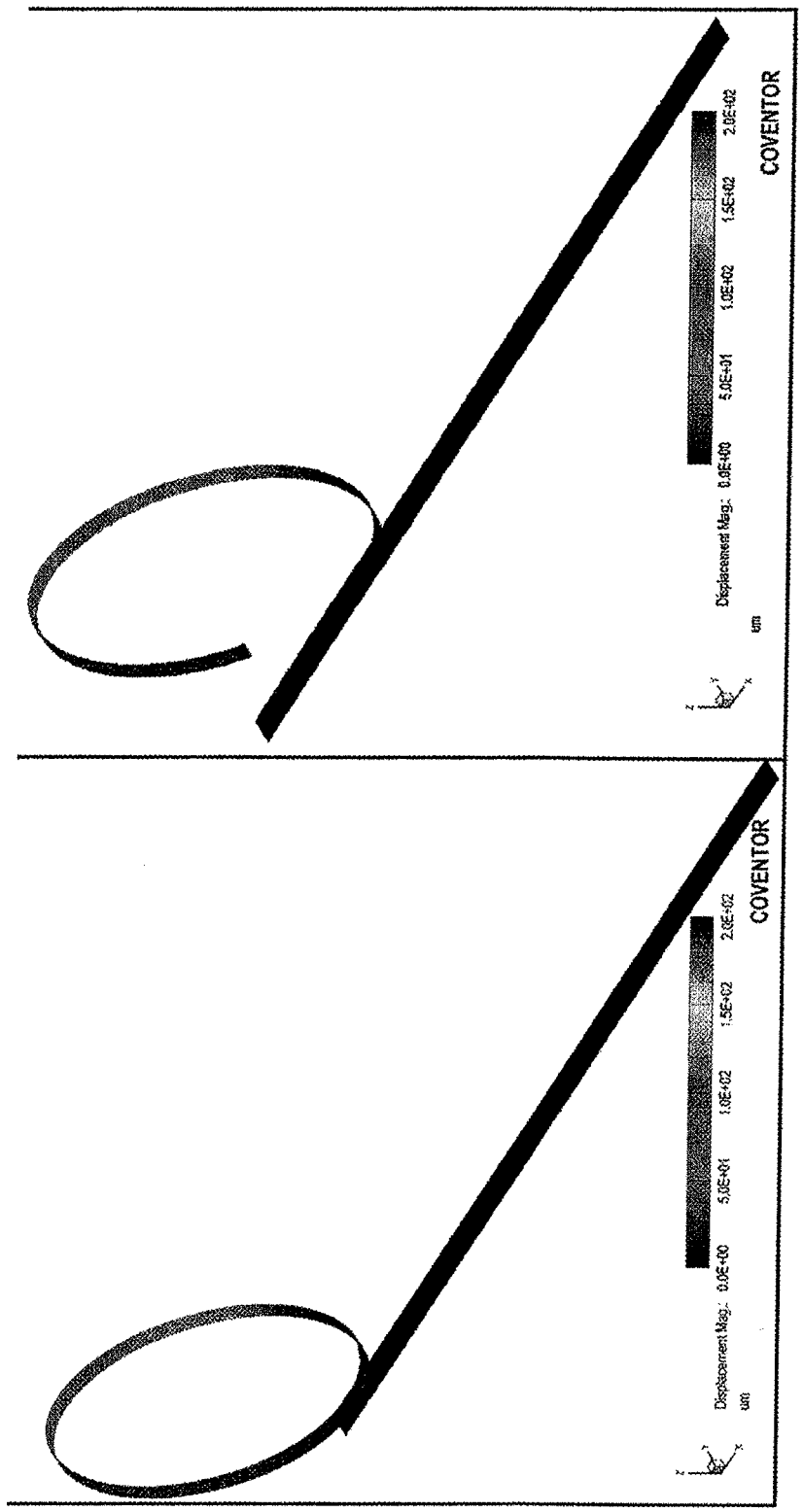
FIG. 14A-F shows an image sequence at various voltages, over the course of an unrolling process of an electrode, according to multiple embodiments and alternatives.
Figures 14C, 14D:
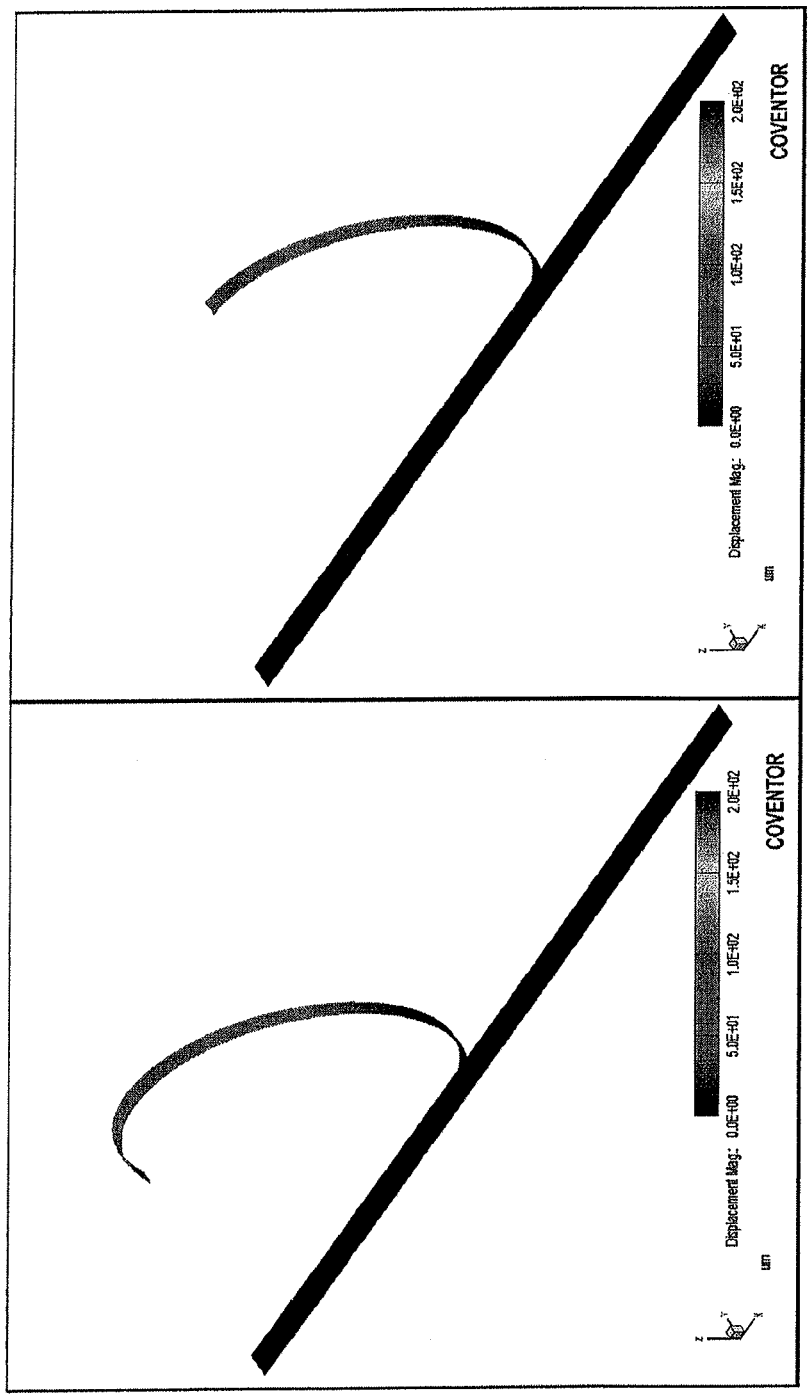
Figures 14E, 14F:
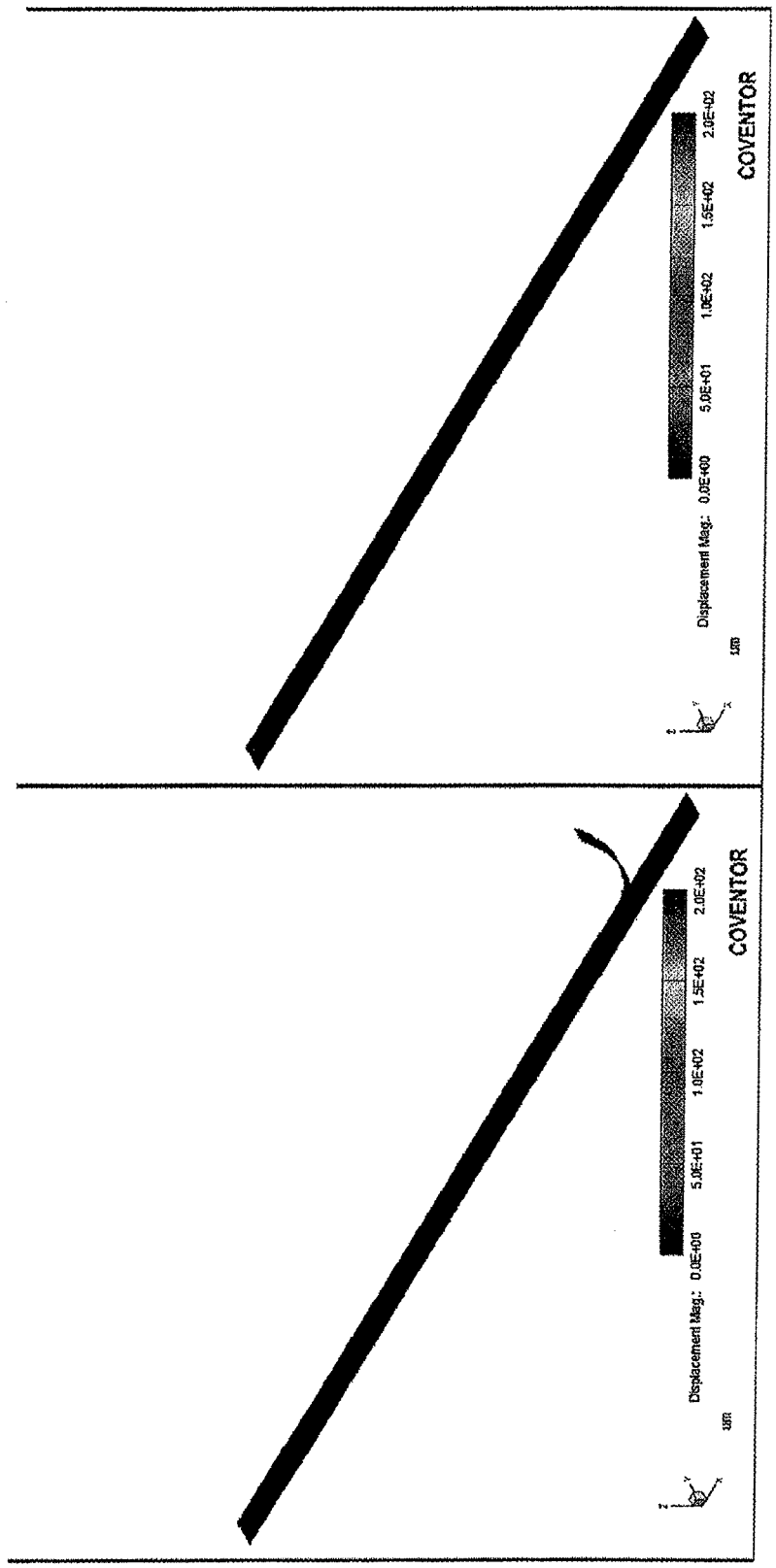

A finite element analysis software package (CoventorWare®, obtained from Coventor, Inc., Cary, N.C.) was used to simulate the operation and characterize electrostatic and mechanical aspects of device 10, utilizing both Boundary Element Method (BEM) and Finite Element Method (FEM). In FIG. 13, second electrode (rolled in the illustration coiled) comprises a strain mismatched bilayer formed from polysilicon, having a top polysilicon layer with a tensile stress of 800 megapascals (MPa) and a bottom polysilicon layer with a compressive stress of 500 MPa, and having a simulation length of 226 μm, with width of 4 μm and thickness of 0.36 μm. The first electrode (flat) comprises an aluminum plate with zero internal stress. A silicon dioxide over the flat plate with a thickness 0.01 μm acts as the dielectric layer. When voltage is applied between the two electrodes, an electrostatic force develops between the plates which try to unroll the second electrode, but the mechanical restoring force tries to retain the initial rolled shape. Thus, until a sufficient voltage is applied to overcome the restoring force, the movement is negligible, but once the applied voltage exceeds that threshold value pull-in starts to occur, such that within a few volts the second electrode unrolls completely. FIGS. 14A-F show the unrolling sequence as the second electrode unrolls with application of increasing voltages, specifically at (FIG. 14A) 0V-21V (14B) 22V (14C) 24V (14D) 26V (14E) 30V and (14F) 32V. For this particular simulation, pull-in starts at 22V (FIG. 14B) and complete unrolling occurs at 32V (FIG. 14F).

Figure 15:
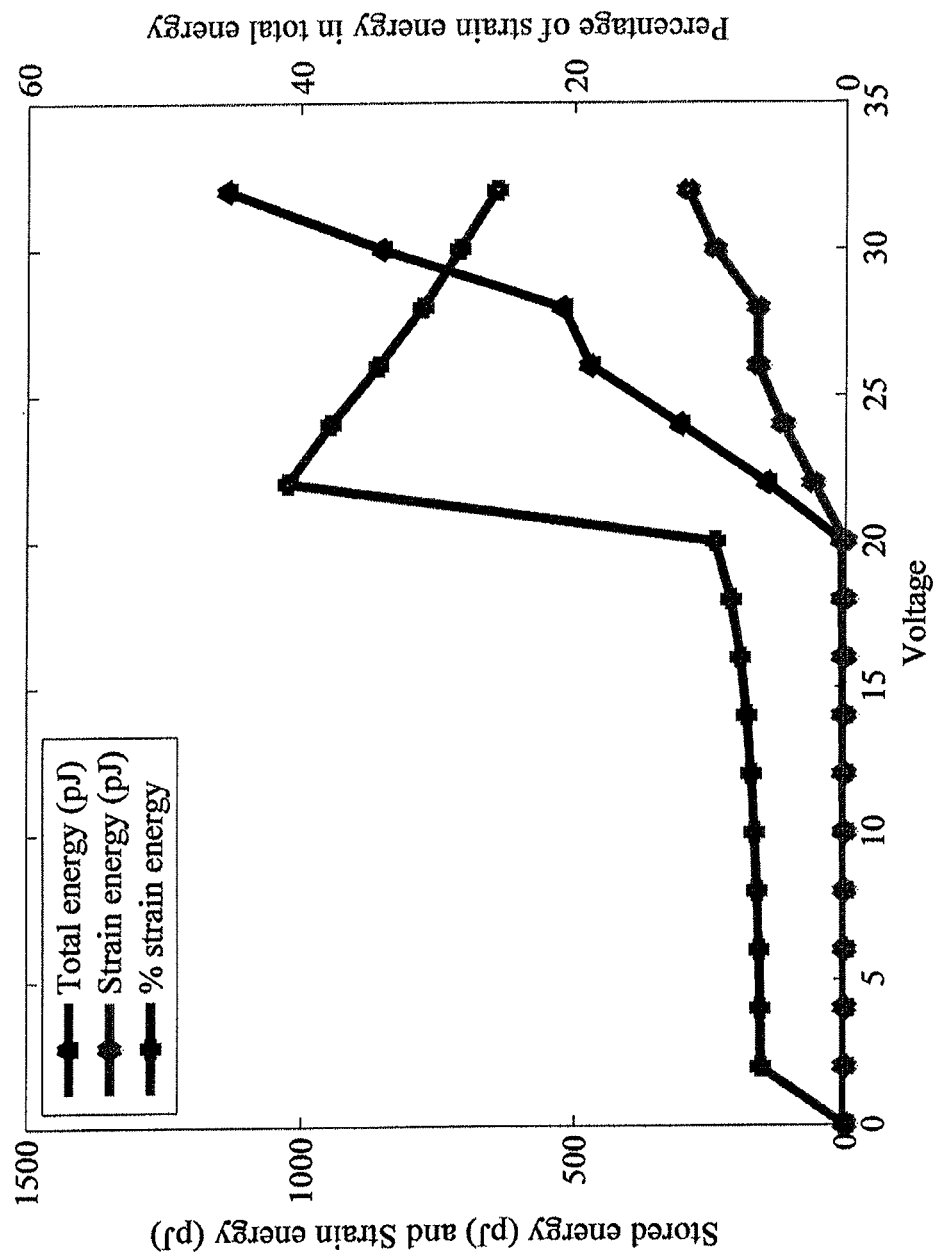
FIG. 15 is a graph which depicts results of a simulation study involving a strain capacitor energy storage device, according to multiple embodiments and alternatives.

With respect to the charge vs. voltage profile, because pull-in occurs within a small range of voltage, most of the energy is stored in that voltage range of 22V-32V, and most of the energy can be extracted at that voltage range before the voltage drops below a usable level. The energy vs voltage plots are shown in FIG. 15, in which total stored energy, strain (mechanical) energy, and percentage of strain energy in the device are plotted against voltage, with a same-size, fixed, flat plate capacitor also plotted as a comparison. The graph shows a higher dU/dV and a higher total energy for the device than the fixed, flat plate capacitor. The higher total energy is due to the addition of mechanical strain energy in the system.

Figures 16A, 16B:
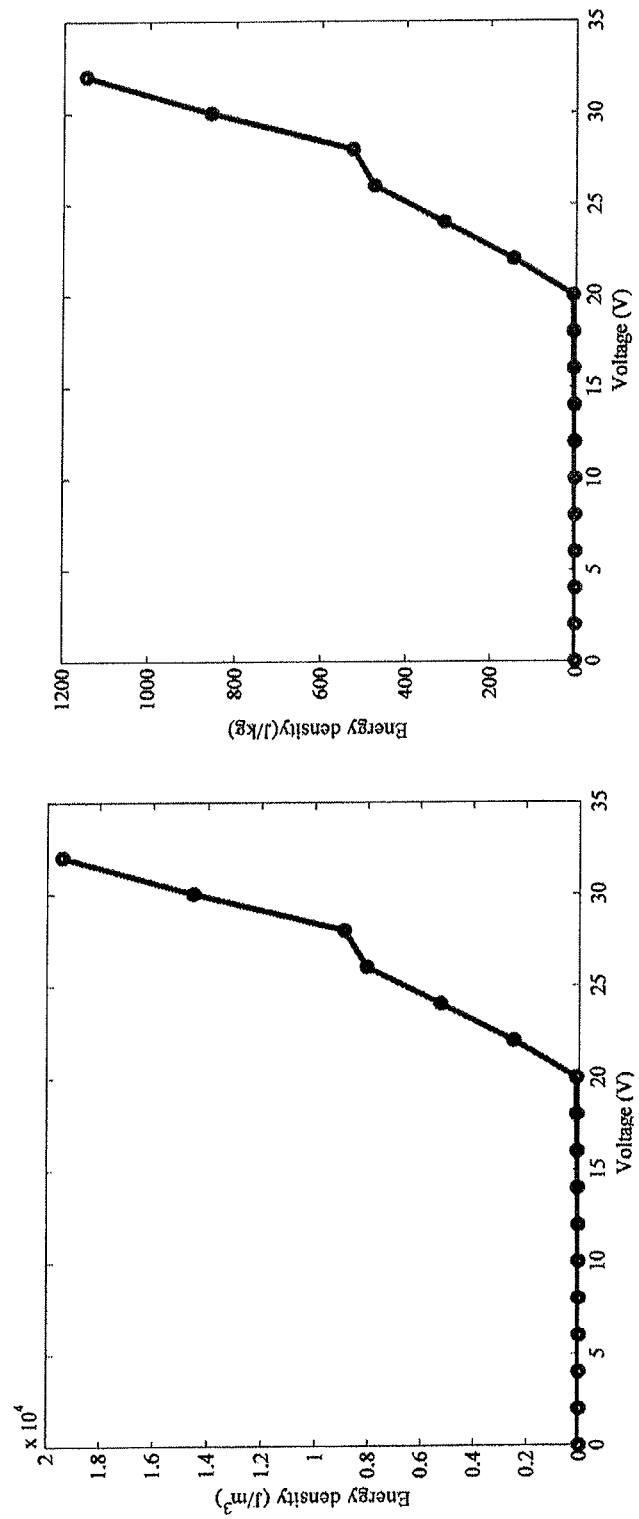
FIGS. 16A and 16B are graphs which depict results of a simulation study involving a strain capacitor energy storage device, according to multiple embodiments and alternatives described herein.

The simulation results were also analyzed with respect to energy density per unit volume and energy density per unit mass—criteria which are commonly used to define the capacity of an energy storage device. FIG. 16A shows a graph illustrating the energy density per volume vs. voltage, and FIG. 16B plots the energy density per mass vs. voltage. It will be seen that the energy densities are much higher at the pull-in voltage range, as the curves begin to slope upward. When calculating energy density per mass, the total mass of the device was calculated by considering the density of aluminum to be 2,700 kg/m$^3$, the density of polysilicon to be 2,230 kg/m$^3$, and the density of silicon dioxide to be 2,200 kg/m$^3$. Volume of the device took into account that the second electrode must be able to operate through its unrolling/rolling cycles without hindrance, i.e., sufficient space to unroll and roll during the respective charging and discharging cycles. Because the volume is mostly made of air, the weight of the device is very low, which is a very attractive feature energy storage used with for portable electronics such as laptops, mobile phones and electric vehicles.

Mechanical-only Simulation

Figure 17:
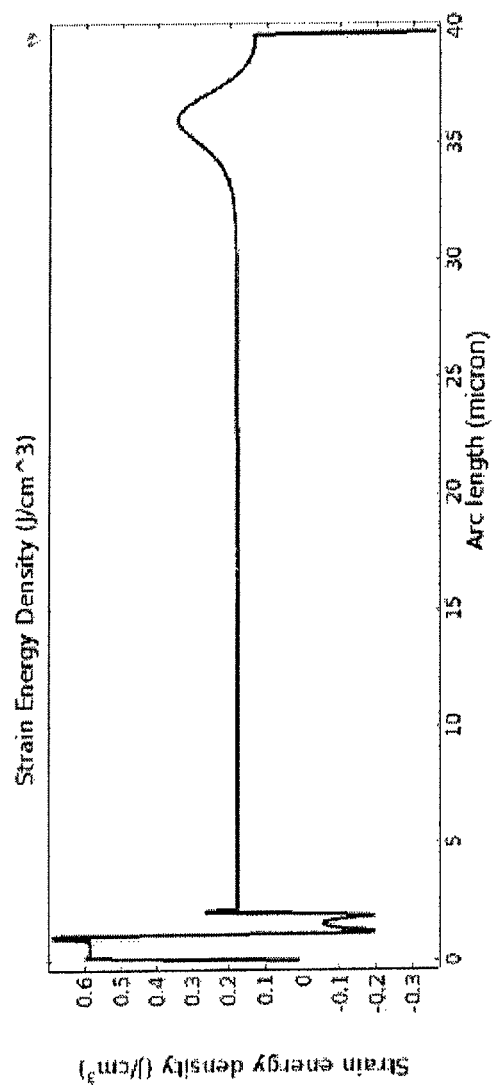
FIG. 17 is a graph which depicts results of a simulation study involving a strain capacitor energy storage device, according to multiple embodiments and alternatives.

A mechanical-only simulation was performed using the program COMSOL® obtained from COMSOL, Inc. of Burlington, Mass. COMSOL® requires the air to be meshed to calculate the electrostatic forces, and even a deformable mesh will not accommodate the curled geometry. CoventorWare® is unique in that it does not require the air to be meshed to calculate electrostatic forces. The COMSOL simulation used different dimensions than the CoventorWare® simulation, with different materials used for the second electrode and, therefore, different amounts of stresses. The layer of the second electrode corresponding with COMSOL simulation was carried out with different top electrode material; and the layers of top electrode had different amount of stresses. The tensile layer in the simulation (corresponding with layer 20b in FIG. 3) was aluminum with a tensile stress of 750 MPa. The compressive layer (corresponding with layer 20a in FIG. 3) was silicon dioxide with a compressive stress of 300 MPa. The area of the electrodes was 40 µm×1 µm, and the oxide thickness was 0.05 µm. As with the CoventorWare® simulation, the stored energy was tracked against applied voltage, in this case the stored energy being mechanical associated with the strain produced by unrolling of second electrode. FIG. 17 shows the mechanical strain energy as a function of distance along the second electrode, obtained from COMSOL. Ignoring end effects, the mechanical strain energy is uniform along the length of this electrode.

Some Alternative Configurations of Strain Capacitor

Figure 18:
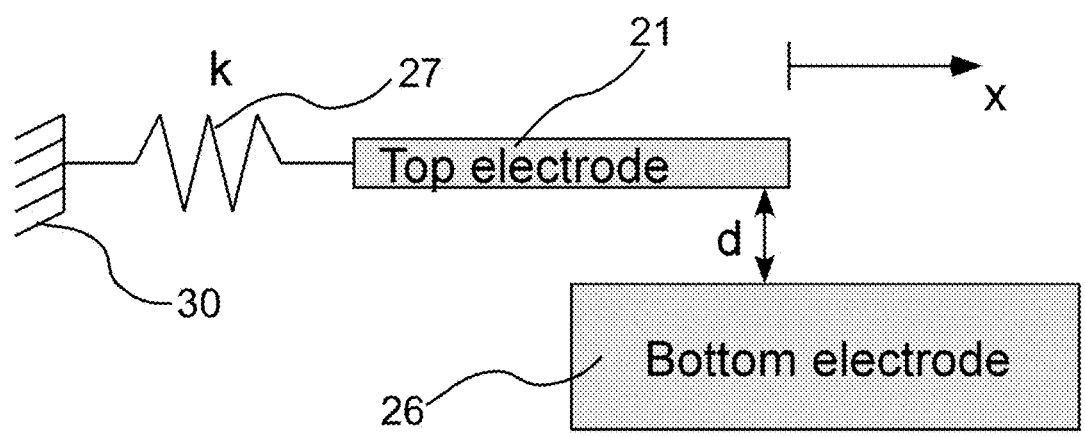
FIG. 18 is a schematic view of a strain capacitor where the top electrode moves parallel to the bottom electrode, according to multiple embodiments and alternatives.

A simple configuration of the strain capacitor is shown in FIG. 18 where the top electrode 21 moves horizontally on response to external voltage between 21 and 26. An external spring 27, with spring constant k, supplies the restoring force to bring the top electrode back to its original position when the voltage is withdrawn. The external spring 27 is mounted on a rigid support 30 on one end and connected to the top electrode 21 at other end. The capacitance changes with the amount of vertical overlap area between top electrode 21 and bottom electrode 26. The separation between two electrodes 21 and 26 is d.

Figure 19:
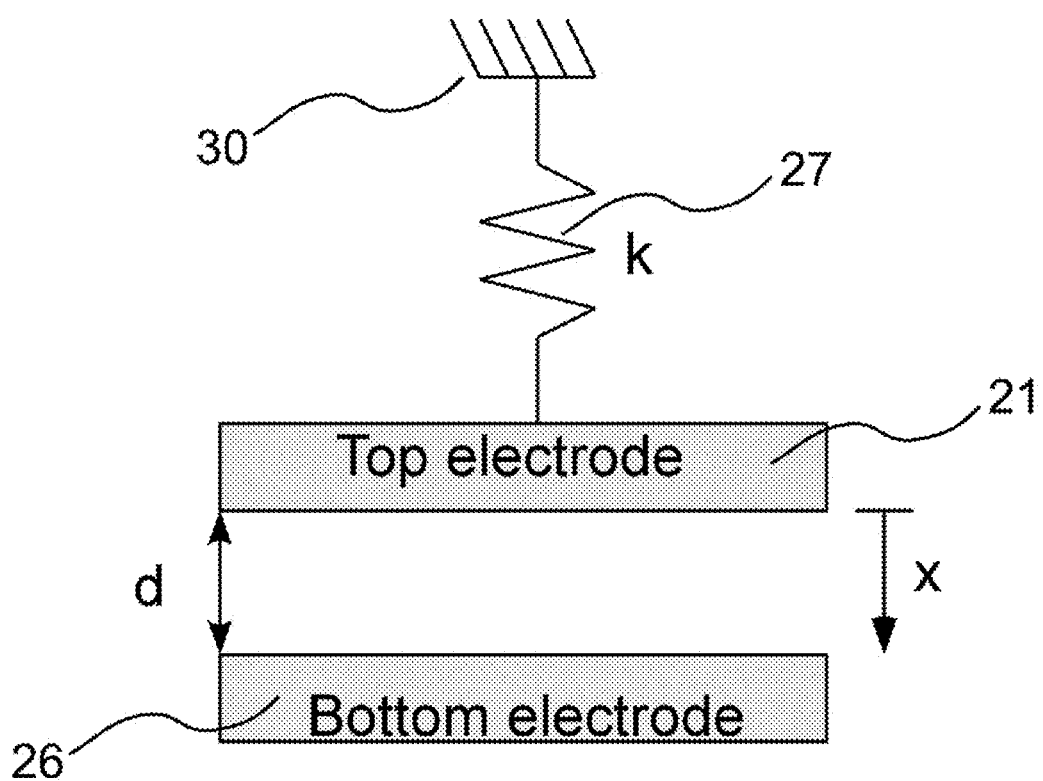
FIG. 19 is a schematic view of a strain capacitor where the top electrode moves towards the bottom electrode, according to multiple embodiments and alternatives.

Another simple configuration of strain capacitor is shown in FIG. 19, where the top electrode 21 moves vertically in response to an electric field applied between the electrodes 21 and 26. An external spring 27 is connecting the top electrode 21 to a rigid support 30 providing the necessary restoring force. With the movement of the top electrode 21, the separation between the electrodes 21 and 26 varies that changes the capacitance.

Figure 20:
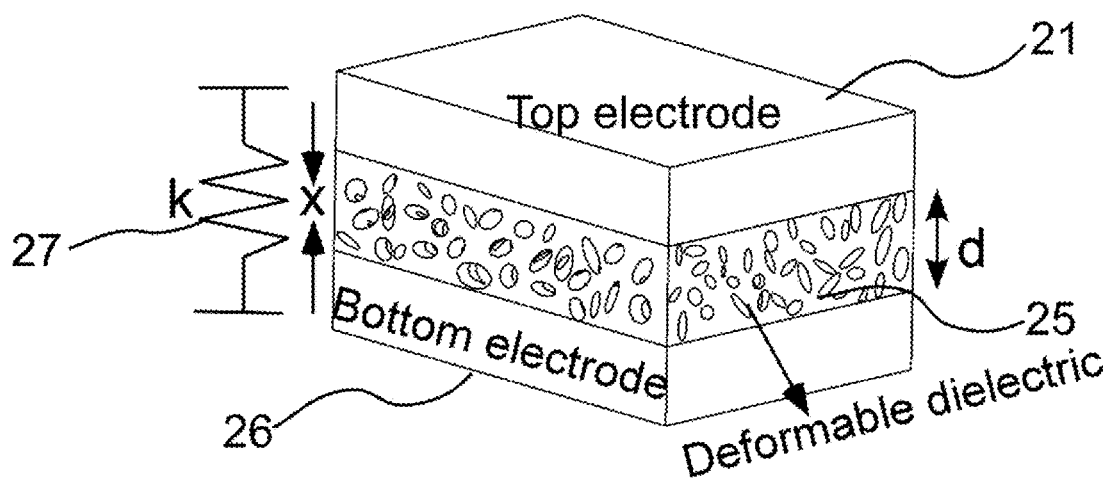
FIG. 20 is a perspective view of a strain capacitor where two electrodes are separated by a deformable dielectric material, according to multiple embodiments and alternatives.

FIG. 20 shows a configuration of strain capacitor where two electrodes 21 and 26 are separated by a deformable dielectric material 25, that changes shape when the top electrode 21 exerts a force on the dielectric material. Typically the dielectric material 25 is compressed between the top electrode 21 and the bottom electrode 26. Examples of a deformable dielectric material include, but are not limited to, a sponge or rubber. This insulating material acts both as a dielectric medium and a spring that provides the restoring force. Schematic of a spring 27 with spring constant k illustrates the mechanical behavior of the deformable dielectric material.

Figure 21:
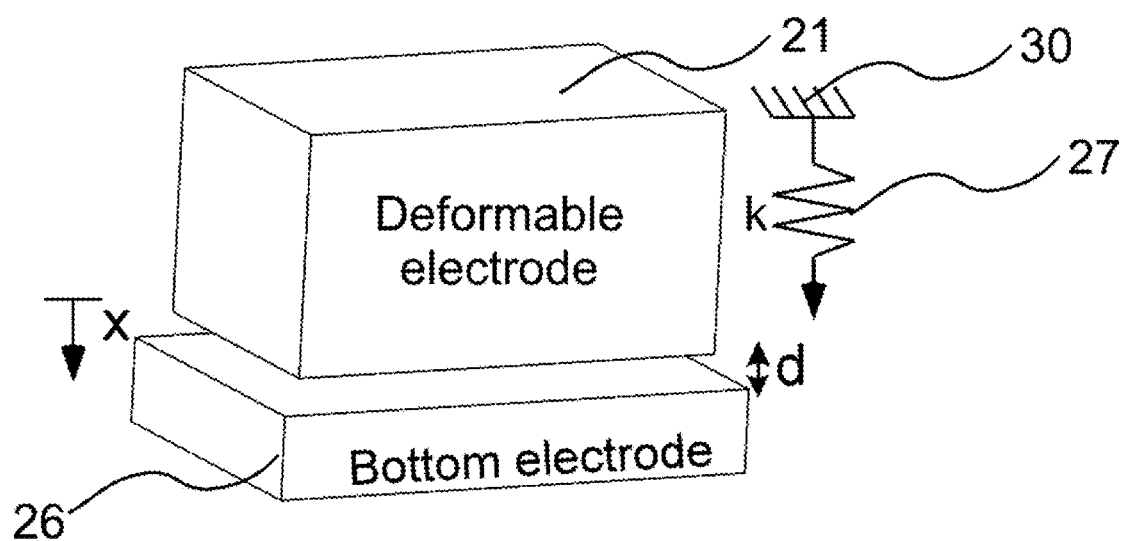
FIG. 21 is a perspective view of a strain capacitor comprising one deformable electrode and one rigid electrode, according to multiple embodiments and alternatives.

A strain capacitor comprising a deformable top electrode 21 and a rigid electrode 26 is shown in FIG. 21. The initial separation between the electrodes at zero applied voltage is d. With application of voltage between 21 and 26, the top electrode deforms and reduces the initial separation, which in turn changes the capacitance. The deformation of the top electrode causes the top electrode to act as a spring with spring constant k providing the necessary restoring force. Schematic diagram of a spring 27 illustrates this concept.

Figure 22:
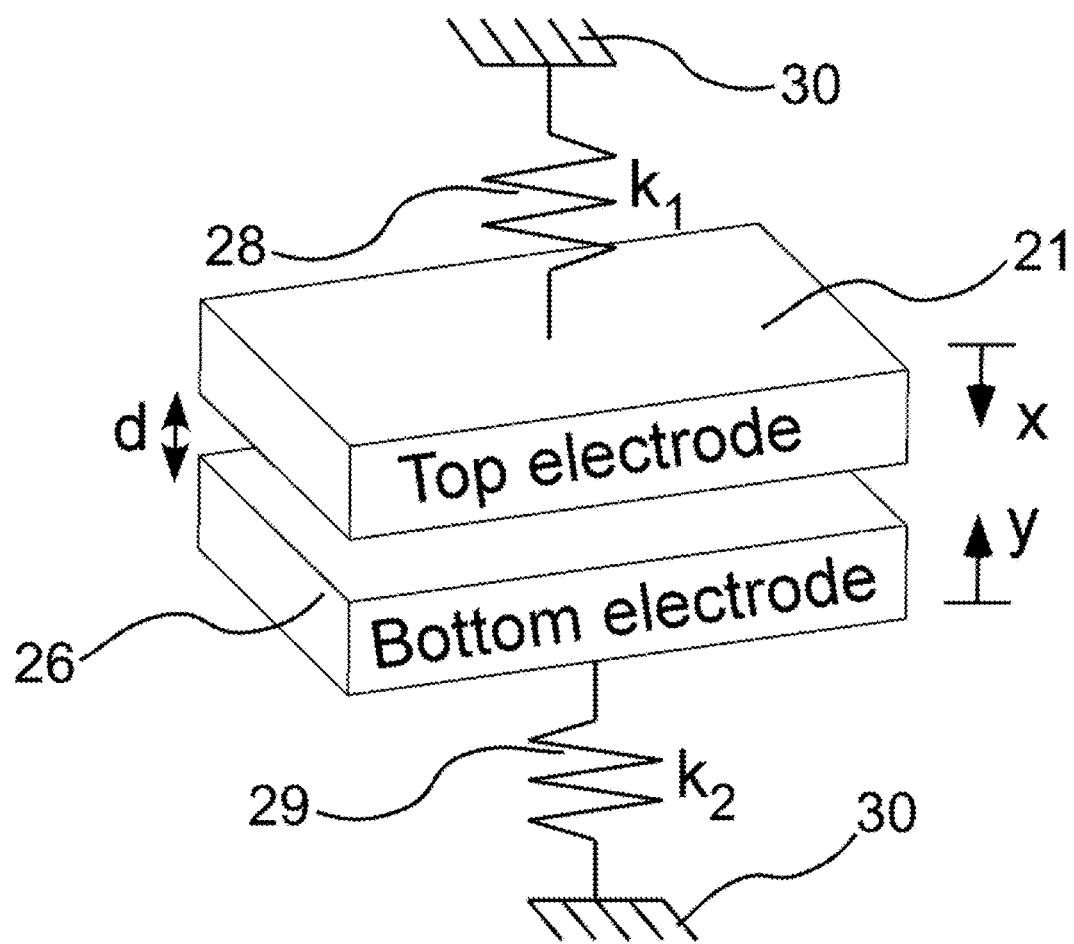
FIG. 22 is a perspective view of a strain capacitor that has two movable electrodes both connected to external springs, according to multiple embodiments and alternatives.

A strain capacitor with two spring mounted movable electrodes is shown in FIG. 22. When voltage is applied between the electrodes 21 and 26, the initial separation d decreases causing the capacitance to change. The external springs 28 and 29 provides the necessary restoring forces.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways. Also, it is to be understood that words and phrases used herein are for the purpose of description and should not be regarded as limiting. The use herein of such words and phrases as "such as," "comprising," "e.g.," "containing," or "having" and variations of those words is meant to encompass the items listed thereafter, and equivalents of those, as well as additional items. The use of "including" (or, "include," etc.) should be interpreted as "including but not limited to."

Accordingly, the foregoing descriptions of several embodiments and alternatives are meant to illustrate, rather than to serve as limits on the scope of what has been disclosed herein. The descriptions herein are not intended to be exhaustive, nor are they meant to limit the understanding of the embodiments to the precise forms disclosed. It will be understood by those having ordinary skill in the art that modifications and variations of these embodiments are reasonably possible in light of the above teachings and descriptions.

We claim:

1. An energy storage device, comprising:
   first and second electrodes forming a capacitor;
   the second electrode formed from a strain mismatched bilayer causing it to roll up in its natural, uncharged state;
   a dielectric layer facilitating the generation of an electric field between the electrodes,
   wherein application of voltage results in the storage of electrostatic energy, and induces the second electrode to unroll, such that the work associated with unrolling is stored in the device as mechanical energy; and wherein the stored mechanical energy is extracted as electrical energy by the energy storage device when the stored electrostatic energy is extracted and the energy storage device returns to the natural, uncharged state.

2. The energy storage device of claim 1, wherein stored energy is extractable in its entirety in electrical form during discharging.

3. The energy storage device of claim 1, wherein both electrodes are formed from strain mismatched bilayers causing them to roll up in their natural, uncharged state resulting in more mechanical energy storage capability due to unrolling of two electrodes with application of voltage.

4. An assembly, comprising a plurality of devices according to claim 1, and further comprising a supporting structure for accepting the devices and at least one separator positioned between any two devices.

5. An energy storage device, comprising:
first and second electrodes forming a capacitor;
a dielectric layer facilitating the generation of an electric field between the electrodes;
wherein application of a voltage results in the storage of electrostatic energy, and one or both electrodes may be moved or deformed with application of external voltage causing a change in capacitance, such that the work associated with the electrode movement or deformation is stored in the device as mechanical energy; and
wherein the work stored as mechanical energy is extracted as electrical energy by the energy storage device when the stored electrostatic energy is extracted and the energy storage device returns to a natural, uncharged state.

6. The energy storage device of claim 5, wherein stored energy is extractable in its entirety in electrical form during discharging.

7. The energy storage device of claim 5, wherein the first and second electrodes comprise a spring mounted electrode adapted to be moved relative to another electrode to decrease the separation between the first and second electrodes causing the capacitance to change.

8. The energy storage device of claim 5, wherein the first and second electrodes comprise a spring mounted electrode adapted to be moved relative to another electrode to change the amount of overlap between the first and second electrodes causing the capacitance to change.

9. The energy storage device of claim 5, wherein at least one of the first and second electrodes can be deformed to change the separation between the electrodes and thus changing the capacitance.

10. The energy storage device of claim 5, wherein both of the first and second electrodes can move with application of voltage and a restoring force is provided by external springs attached to both of the first and second electrodes.

11. An assembly, comprising a plurality of devices according to claim 5, and further comprising a supporting structure for accepting the devices and at least one separator positioned between any two devices.

* * * * *